United States Patent
Mansikkasalo

(10) Patent No.: US 12,039,239 B2
(45) Date of Patent: Jul. 16, 2024

(54) METHOD FOR OBTAINING INFORMATION ON QUALITY OF COMBUSTION OF A LIQUOR IN A CHEMICAL RECOVERY BOILER AND A METHOD FOR CONTROLLING A CHEMICAL RECOVERY BOILER

(71) Applicant: Valmet Automation Oy, Espoo (FI)

(72) Inventor: Jarmo Mansikkasalo, Pirkkala (FI)

(73) Assignee: VALMET AUTOMATION OY, Espoo (FI)

( * ) Notice: Subject to any disclaimer, the term of this patent is extended or adjusted under 35 U.S.C. 154(b) by 509 days.

(21) Appl. No.: 17/183,962

(22) Filed: Feb. 24, 2021

(65) Prior Publication Data
US 2021/0279390 A1    Sep. 9, 2021

(30) Foreign Application Priority Data
Mar. 6, 2020    (FI) ..................................... 20205240

(51) Int. Cl.
*G06F 30/28* (2020.01)
*D21C 3/22* (2006.01)
(Continued)

(52) U.S. Cl.
CPC ............. *G06F 30/28* (2020.01); *D21C 3/228* (2013.01); *D21C 11/0057* (2013.01); *F23G 7/04* (2013.01); *G06F 30/27* (2020.01); *G06F 2113/08* (2020.01)

(58) Field of Classification Search
CPC ...... G06F 30/28; G06F 30/27; G06F 2113/08; G06F 30/20; D21C 3/228; D21C 11/0057;
(Continued)

(56) References Cited

U.S. PATENT DOCUMENTS

| 2009/0139468 A1* | 6/2009 | Saviharju | G01J 5/0044 |
| | | | 122/448.1 |
| 2012/0053720 A1* | 3/2012 | Mathur | G05B 13/042 |
| | | | 703/2 |

FOREIGN PATENT DOCUMENTS

| EP | 3296457 A1 | 3/2018 |
| JP | S59-145418 A | 8/1984 |

(Continued)

OTHER PUBLICATIONS

Miljami Maakala, et al. "Computational fluid dynamics modeling and experimental validation of heat transfer and fluid flow in the recovery boiler superheater region," Applied Thermal Engineering 139 (2018) 222-238 (Year: 2018).*

(Continued)

*Primary Examiner* — Steven W Crabb
(74) *Attorney, Agent, or Firm* — Oliff PLC

(57) ABSTRACT

A method for obtaining information on quality of combustion of a liquor in a chemical recovery boiler. The method comprises entering a value of a first input parameter to a computational model configured to determine, based on the value of the first input parameter, a value of the quality of combustion of the liquor in the chemical recovery boiler, and at a first time, running the computational model to obtain a first modelling result. The method comprises measuring, from the chemical recovery boiler a value indicative of carryover to obtain a measurement result; comparing the first modelling result with [a] the measurement result or [b] a result derived from the measurement result, to obtain a primary comparison result; and adjusting the value of the first input parameter based on the primary comparison result to obtain an adjusted value of the first input parameter. The method comprises entering the adjusted value of the first input parameter to the computational model, and at a second (Continued)

time, running the computational model to obtain the information on quality of combustion of the liquor in the chemical recovery boiler.

19 Claims, 11 Drawing Sheets

(51) Int. Cl.
*D21C 11/00* (2006.01)
*F23G 7/04* (2006.01)
*G06F 30/27* (2020.01)
*G06F 113/08* (2020.01)

(58) Field of Classification Search
CPC .......... D21C 3/22; D21C 11/12; D21C 11/04; F23G 7/04; F23G 5/50; F23G 2206/20; F23G 2209/101; F23G 2900/55; Y02E 20/12; F23M 11/04; G05B 13/04
See application file for complete search history.

(56) References Cited

FOREIGN PATENT DOCUMENTS

| | | |
|---|---|---|
| JP | H02-191788 A | 7/1990 |
| JP | H04-11088 A | 1/1992 |
| WO | WO-98/27474 A1 | 6/1998 |
| WO | WO-2010/092430 A1 | 8/2010 |

OTHER PUBLICATIONS

Swedish Office Action for Patent Application No. 2150155-6, dated Oct. 20, 2021, (15 pages), Swedish Patent and Registration Office, Stockholm, Sweden.

Blue, Jerry D. et al. *Advanced Combustion and Flow Modeling: Comprehensive Model Study Improves Recovery Boiler Operation*, TAPPI Journal, Jul. 2000, pp. 1-13.

Engblom, Markus et al. *CFD-Modeling For More Precise Operation of the Kraft Recovery Boiler*, TAPPI Journal, vol. 11, No. 11, Nov. 2012, pp. 19-27.

Saviharju, Kari et al. *Numerical Modeling Feedback in Recovery Boilers*, International Chemical Recovery Conference, vol. 1, Jun. 6-10, 2004, pp. 247-262, Charleston, South Carolina, ISBN: 978-1-59510-040-5.

Leppanen, A. et al. *Numerical Modeling of Fine Particle and Deposit Formation in a Recovery Boiler*, Fuel, vol. 129, Mar. 20, 2014, pp. 45-53, DOI: 10.1016/j.fuel.2014.03.046.

Macek, Andrej. Research on Combustion of Black-Liquor Drops, Progress in Energy and Combustion Science, vol. 25, (1999), pp. 275-304.

Finnish Office Action for U.S. Appl. No. 20/205,240, dated Nov. 14, 2022, (13 pages), Finnish Patent and Registration Office, Helsinki, Finland.

"Computer Simulation," Wikipedia, Mar. 4, 2020, (13 pages), [article, online], Retrieved from the Internet Oct. 31, 2022] <https://en.wikipedia.org/w/index.php?title=Computer_simulation&oldid=943854181>.

Swedish Office Action for Application No. 2150155-6, dated Apr. 14, 2023, (13 pages), Swedish Patent and Registration Office, Stockholm, Sweden.

Bergroth, Nici et al. *CFD-Based Modeling of Kraft Char Beds—Part 1: Char Bed Burning Model*, Recovery Boiler Modeling, Tappi Journal, vol. 9, No. 2, Feb. 2010, pp. 6-13.

Engblom, Markus et al. *CFD-Based Modeling of Kraft Char Beds—Part 2: A Study on the Effects of Droplet Size and Bed Shape on Bed Processes*, Recovery Boiler Modeling, Tappi Journal, vol. 9, No. 2, Feb. 2010, pp. 15-20.

Pathania, Nanan. *A Study of Composition of Kraft Recovery Boiler Carryover Particles Using an Entrained Flow Reactor*, Thesis, (2001), (87 pages), University of Toronto.

Fakhrai, Reza. *Modelling of Carry-Over in Recovery Furnaces*, Licentiate Thesis, Department of Metallurgy, Nov. 1999, (73 pages), Stockholm, Sweden.

"Computer Simulation," Wikipedia, Mar. 4, 2020, (10 pages), [article, online], Retrieved from the Internet Oct. 31, 2022] <https://en.wikipedia.org/w/index.php?title=Computer_simulation&oldid=9438541 81>.

\* cited by examiner

METHOD FOR OBTAINING INFORMATION ON QUALITY OF COMBUSTION OF A LIQUOR IN A CHEMICAL RECOVERY BOILER AND A METHOD FOR CONTROLLING A CHEMICAL RECOVERY BOILER

CROSS REFERENCE TO RELATED APPLICATIONS

This application claims priority to and the benefit of Finland Patent Application No. 20205240, filed on Mar. 6, 2020, the contents of which as are hereby incorporated by reference in their entirety.

BACKGROUND

Related Field

The invention relates to chemical recovery boilers. The invention relates to methods for obtaining information on quality of combustion of a liquor in chemical recovery boiler. The invention relates to methods for obtaining information on combustion conditions inside a chemical recovery boiler. The invention relates to methods for controlling a chemical recovery boiler. The invention relates to computational models used for modelling quality of combustion of a liquor in a chemical recovery boiler. The invention relates to computational models used for modelling combustion conditions in a chemical recovery boiler. Chemical recovery boilers are used in the production of pulp to recover cooking chemicals by burning black liquor or brown liquor.

Related Art

Chemical recovery boilers are used in pulp and paper industry in the production of pulp to recover cooking chemicals by burning black liquor or brown liquor. Black liquor is an intermediate product in the Kraft process (i.e. sulphate process) and brown liquor is an intermediate product in the sulphite process. In the recovery process, concentrated black liquor (in sulphate process) or brown liquor (in sulphite process) is fed through injection guns into a furnace of the recovery boiler in form of droplets. In addition, combustion air is fed to the chemical recovery boiler to enable combustion of the liquor (black or brown). When the liquor burns, heat is formed and hot flue gases are generated. In the chemical recovery boiler, heat is recovered from the flue gases first with superheaters and from the thus cooled flue gases also with economizers, which both are heat exchangers. The chemical recovery boiler has two main tasks. First, cooking chemicals are recovered from the bottom of the chemical recovery boiler in the form of smelt. While the cooking chemicals are residues of the black liquor, the combustion of the liquor also reduces the cooking chemical (e.g. in the Kraft process, sodium sulphate $Na_2SO_4$ is reduced to sodium sulphide $Na_2S$), which requires optimal temperature and oxygen content for the reduction to be sufficiently effective. Second, the heat is recovered, and typically used in steam turbines operating generators to produce electricity. Thus, efficient heat recovery is needed. Moreover, the maintenance interval of the recovery boiler should be as long as possible. The maintenance interval is affected e.g. by the accumulation of deposit on the superheaters. The deposit may form e.g. from the liquor or from a residue of the liquor. The reduction and the accumulation of deposit can be affected by the combustion conditions inside the chemical recovery boiler. The reduction and the accumulation of deposit also describe a quality of combustion of the liquor in the chemical recovery boiler. Based on information on the quality of combustion of the liquor, which is derivable from combustion process conditions inside the chemical recovery boiler, the chemical recovery boiler can be controlled.

In the recovery process, concentrated black liquor (in sulphate process) or brown liquor (in sulphite process) is fed to a furnace of the recovery boiler in form of droplets. Depending on the size of the droplets, some of the droplets fall onto a char bed, thereby forming a part of the char bed, to be reduced therein, and some of the droplets may flow with flue gas upwards. The upwards flowing droplets pose the problem of carryover, which is a phenomenon, in which the droplets may flow onto heat transfer surfaces of the chemical recovery boiler. This increases the deposit thickness on the superheaters. Too much deposit on the superheater tubing hinders thermal conduction to steam/water and may also cause malfunction and/or corrosion of the chemical recovery boiler. The carryover can be controlled, if sufficient information on the quality of combustion of the liquor in the chemical recovery boiler is available. For example, the flow velocity of gases, the oxygen content, the temperature, and the droplet size affect the amount of carryover. Carryover is a phenomenon that is hard to control, since carryover typically changes dynamically during operation of the chemical recovery boiler, and may process conditions inside the furnace affect carryover. Moreover, the process conditions themselves change due to carryover.

Information on the combustion conditions inside the chemical recovery boiler can be obtained from a chemical recovery boiler by means of measuring or by means of computational modeling.

Computational modelling is a feasible tool for obtaining information on the quality of combustion of a liquor in a chemical recovery boiler. For example, a computational model may be a model for calculating combustion process conditions (e.g. gas temperature and velocity profiles). In principle, a computational model is used such that values of input parameters are entered into the model, the model is run, and as a result, information on the combustion conditions inside the chemical recovery boiler can determined, i.e. computed.

At present, computational models related to chemical recovery boilers have a drawback, which is the lack of all relevant information, even if a large part of relevant information is available. In particular, a particle size of the liquor droplets in the chemical recovery boiler is needed e.g. to calculate carryover. However, at present, a value for the particle size distribution is assumed, and provided that the value does not correspond to reality, the results are inaccurate. Another such parameter is the deposit thickness on superheaters of the chemical recovery boiler. Things that affect the deposit thickness include an amount of fly ash generated in the furnace, amount of carryover, and effectiveness of soot removal The deposit affects the flow of flue gas inside the chemical recovery boiler e.g. by hindering or preventing flue gas flow. A high flow resistance caused by deposit increases pressure difference in the boiler, which typically levels off variations in flue gas flow profile. Moreover, deposit affects heat exchange from the flue gases, which flow outside the superheater tubers, to steam/water, which flows inside the superheater tubes. At present, neither the size of the carryover particles not the deposit thickness on all heat exchange surfaces can be directly measured. Therefore, a skilled person cannot measure a correct particle size distribution and/or the deposit thickness distribution and enter that into a computational model. Moreover, the value of each one of these parameters changes during operation of the chemical recovery boiler. Therefore, a correct value for a precise moment of time remains unknown, even if a correct value for another moment of time would be available. This makes hard to obtain accurate information on the quality of combustion by computations.

BRIEF SUMMARY

It has now been found how more accurate information on the quality of combustion of a liquor in the chemical recovery boiler can be obtained. First, a value of such a parameter, of which value is only assumed, i.e. a value of a first parameter is entered to the computational model, which is then run to obtain a first modelling result. If needed, a value of such a parameter, of which value is known, i.e. a value of a second parameter is also entered to the computational model before running it. Next, the first modelling result is compared with a measured value or a with a value derived from a measurement or measurements. Thereafter, the value of the first parameter is adjusted based on the result of the comparison. As for the issue of what is measured, the method comprises measuring, from the chemical recovery boiler, a value indicative of carryover, to obtain a measurement result. And finally, the adjusted value of the first parameter is entered to the model, which is then re-run, to obtain more accurate information on the quality of combustion of a liquor in the chemical recovery boiler. The method is disclosed in more specific terms in claim 1.

As for the computational model, the computational model may include a primary part for calculating combustion process conditions (e.g. gas temperature and velocity profiles) and a secondary part for calculating a quality of combustion of a liquor from the combustion process conditions.

The phenomenon of carryover may relate to at least one of the following: presence of carryover particles, change of an amount of carryover particles, and an amount of carryover particles.

Typically control of the chemical recovery boiler, which is a continuous process, lasts for a long period of time, e.g. from one maintenance to another. Moreover, as detailed in background, accurate information on quality of combustion is hard to obtain, and is, at best, only accurate for a short period of time. Therefore, in prior art, computational models have not been used in control of chemical recovery boilers. It has now been found that the information obtainable by the aforementioned method is sufficiently accurate for purposes of controlling a chemical recovery boiler. The information on the quality of combustion of a liquor in the chemical recovery boiler can be used for controlling the chemical recovery boiler.

For example, two simulations may be run with different parameters to determine whether a certain control procedure should be undertaken. In a similar manner, several simulations may be run to simulate the effect of different control procedures, and from the results one may decide which one of the control procedures should be undertaken.

In the figures, the arrow G denotes a direction of gravity, and is directed downwards.

DETAILED DESCRIPTION OF VARIOUS EMBODIMENTS

In this description, the term parameter refers to one or several physical quantities. In case a parameter refers to several physical quantities, each of these quantities is referred to as a component of the parameter. A parameter may be e.g. a height. A parameter may be a pair consisting of a mass and a height. In the latter case, the components of the parameter would be mass and height. The term value of a parameter refers to a value of such a parameter. For example, if the parameter is height, a value of the parameter value may be e.g. 170 cm. For example, if the parameter is a pair consisting of a mass and a height, a value of the parameter may be a pair of (70 kg; 170 cm). A component of the value of the parameter refers to the value of the component of the parameter. For example, if the parameter is a pair consisting of a mass and a height, a value of the parameter may be a pair of (70 kg; 170 cm); whereby a first component of the value would be 70 kg, which would be the value of the first component of the pair (mass; height). The parameter may comprise a number of physical quantities, in which case a value of the parameter may be a vector with the same number of elements. This definition applies in particular to the first parameter and the second parameter and their values, to be defined later.

The invention is described in the context of a Kraft process, wherein concentrated black liquor is burnt in a chemical recovery boiler to recover cooking chemicals. However, the principles are applicable also in a chemical recovery boiler of a sulphite process (i.e. a soda recovery boiler). In view of the presented examples, the only difference is that in the sulphite process brown liquor (or concentrated brown liquor) is burnt instead of black liquor (or concentrated black liquor). This applies to all embodiments presented hereinbelow.

Figure 1:
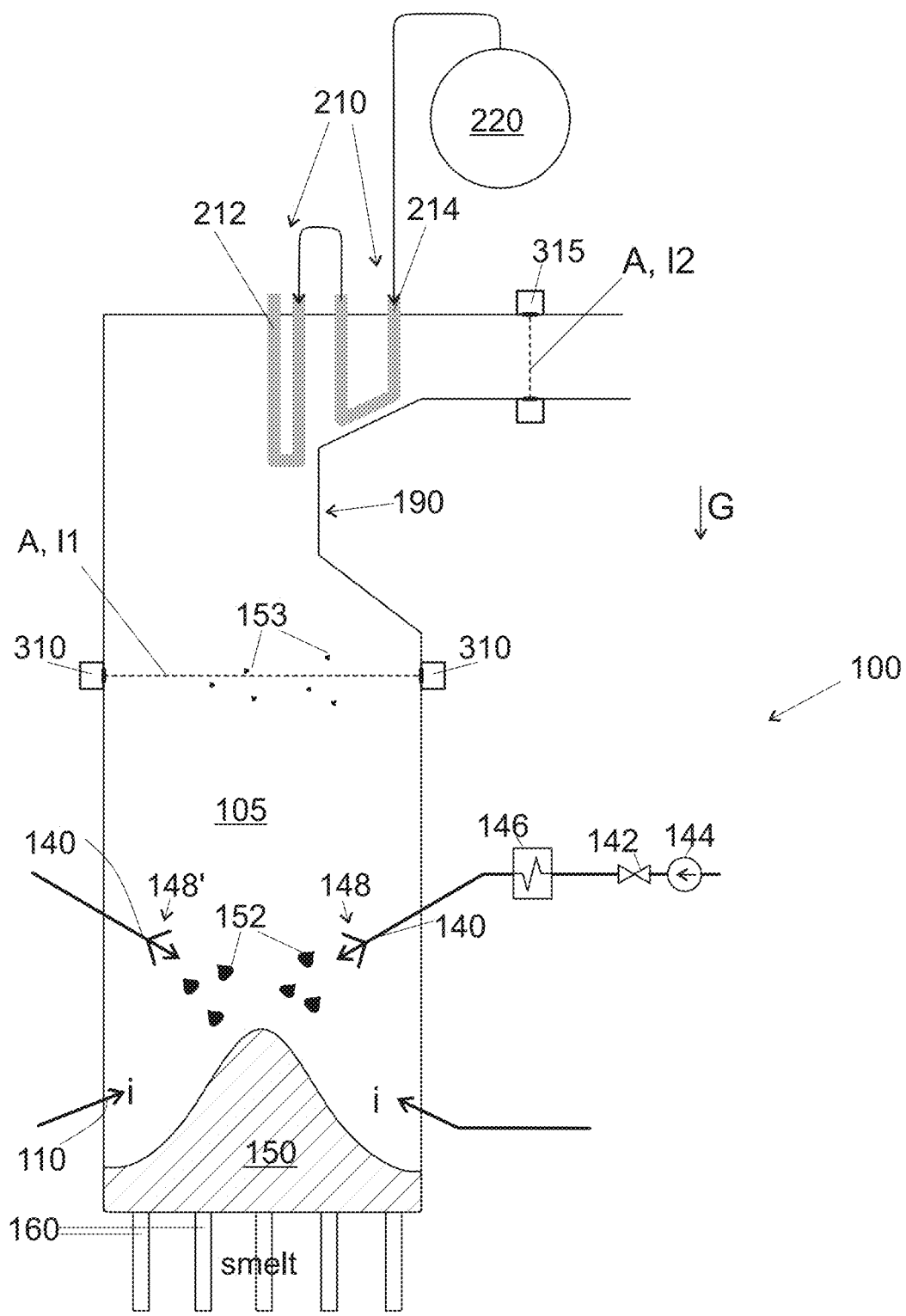
FIG. 1 is a principal side view of a chemical recovery boiler having a thermometer for measuring a temperature profile.
Figure 2:
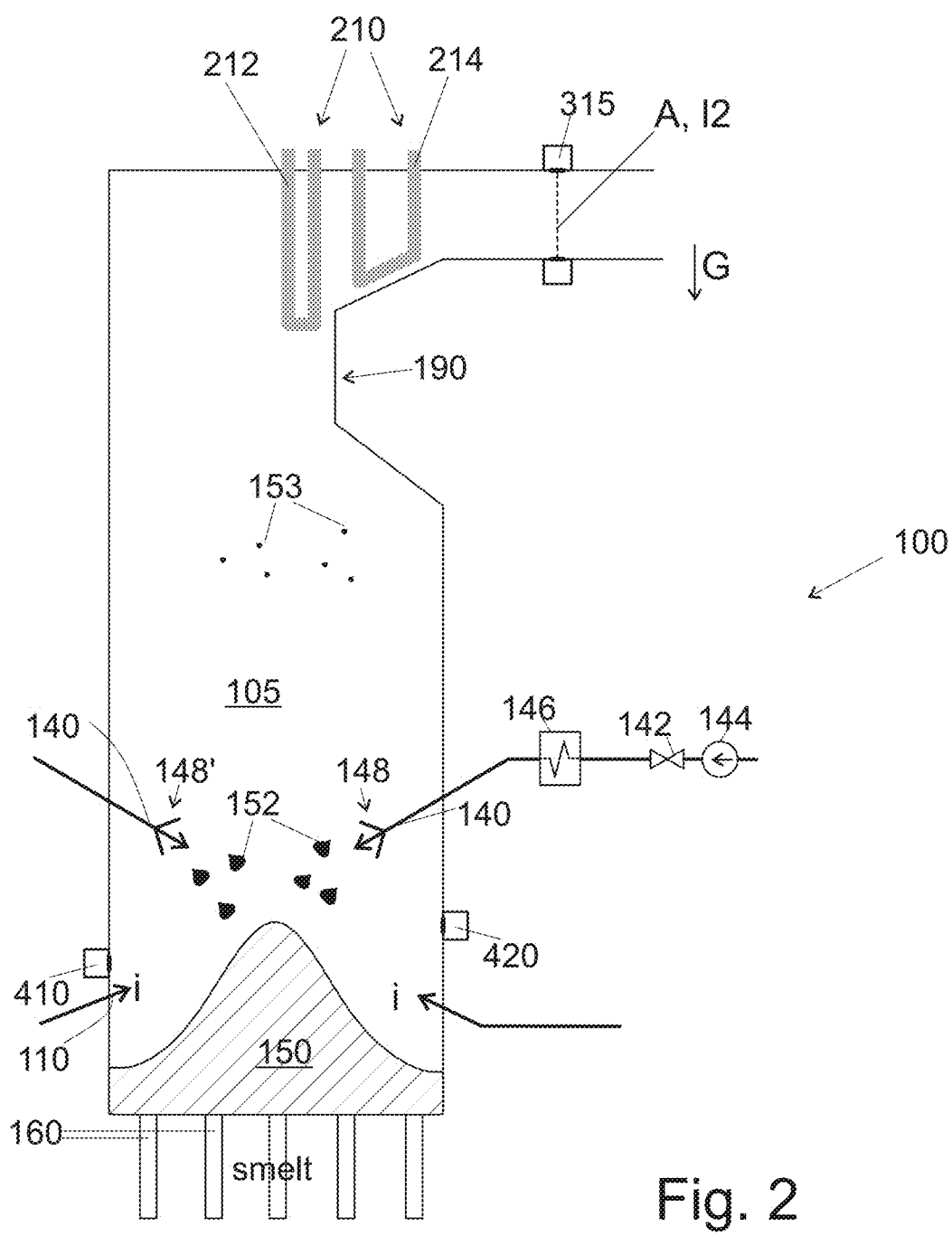
FIG. 2 is a principal side view of a chemical recovery boiler having cameras for measuring a size of a char bed.
Figure 3:
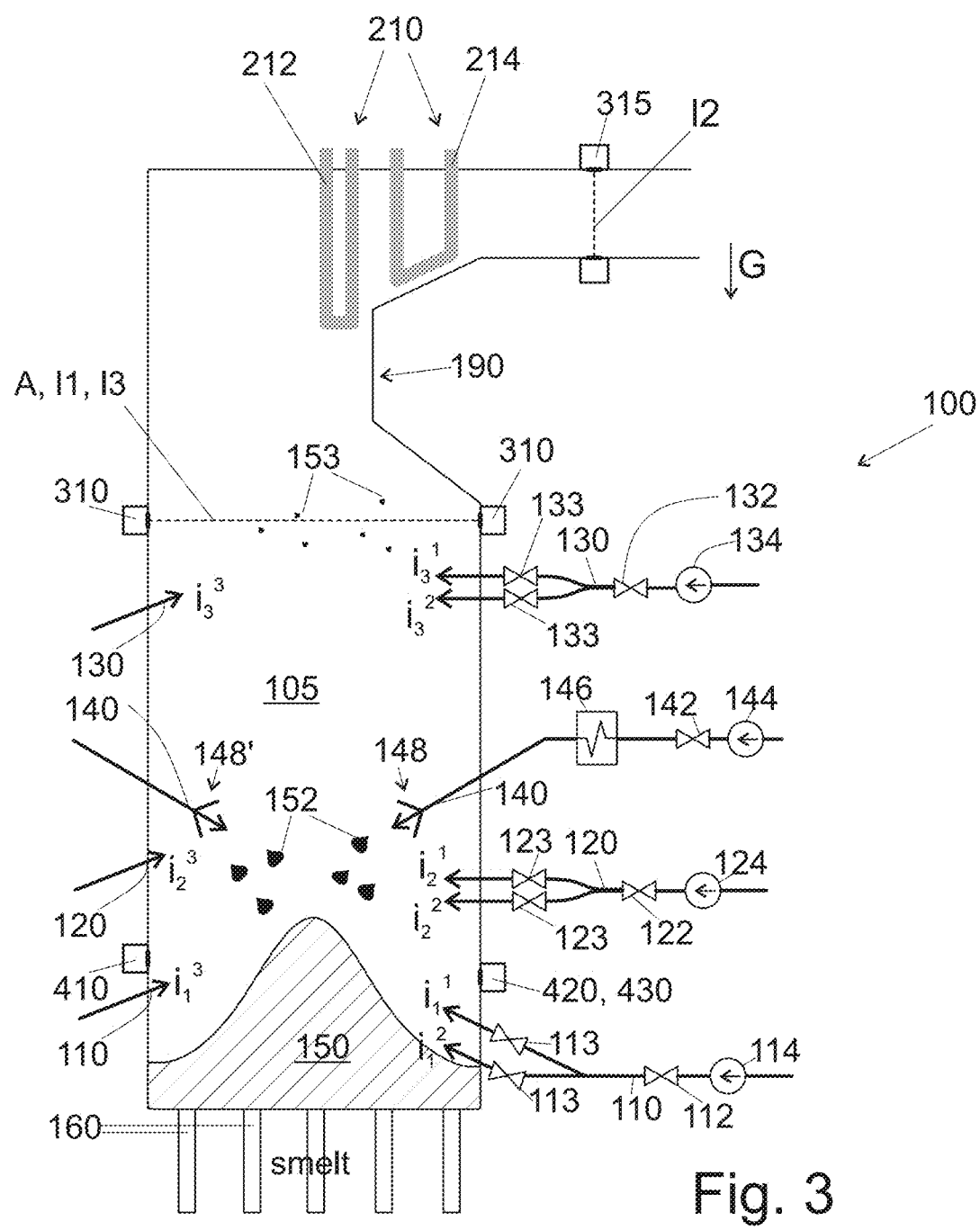
FIG. 3 is a principal side view of a chemical recovery boiler having a thermometer for measuring a temperature profile and cameras for measuring a size of a char bed.

FIGS. 1, 2, and 3 show a chemical recovery boiler 100 configured to burn concentrated black liquor to produce heat and smelt as discussed in the context of background. Heat is produced by burning the concentrated black liquor, which is fed to a furnace 105 in the form of droplets 152. The droplets 152 and/or their combustion residue form a char bed 150 in a lower part of a furnace 105 of the chemical recovery boiler 100. The char bed 150 comprises the smelt. The smelt is let out from the boiler 100 through smelt spouts 160 for further use as part of green liquor, as known in the art.

The heat thus produced is recovered by heat exchangers including superheaters 210 and economizers (not shown). Economizers are arranged in a flue gas channel downstream from a superheater; downstream in the direction of the flow of the flue gases. The heat may be recovered at other heat transfer surfaces such as a boiler bank and/or a screen 320, too (see FIGS. 4a and 4b). Herein the superheaters are commonly denoted by the reference 210, while a first superheater is denoted by the reference 212. The screen 320, if present, may be a superheater. Other possible uses for the screen 320 include use as a reheater, an economizer, or a boiling pipe, such as a riser. Steam is fed to the superheaters from a drum 220 (shown only in FIG. 1). In general, a drum 220 is configured to separate saturated steam from saturated water, the steam being thereafter superheated in superheaters 210.

The chemical recovery boiler 100 comprises a bullnose 190, which narrows the furnace 105. At least a part of the first superheater 212 is arranged at a higher vertical level than the bullnose 190. A purpose of the bullnose 190 is to protect at least one of the superheaters 210, e.g. the first superheater 212 or a second superheater 214, from too hot radiative heat transfer and/or from direct exposure to carryover. A purpose of the bullnose 190 is to guide the flue gas flow through the superheaters 210, in particular also through the first superheater 212. For these reasons, at least a part of the first superheater 212 is arranged at a higher vertical level than the bullnose 190.

In order to burn the black liquor, the chemical recovery boiler 100 comprises a channel 140 for feeding concentrated black liquor into to boiler 100. Concentrated black liquor is fed to the furnace 105 through an injection gun 148, typically through multiple injection guns 148, 148'. The injection guns 148, 148' form droplets 152 of concentrated black liquor within the furnace 105. The droplets 152 may fall, due to gravity, to the char bed 150 and/or flow with air as carryover particles 153 upwards.

In order to provide oxygen for the combustion of the black liquor, combustion air is fed into the furnace. The combustion air is fed at a first vertical level 110, and more typically at several vertical levels, such as a first level 110, a second level 120, and a third level 130 (see FIG. 3). Referring to FIG. 3, the combustion air is fed through several air inlets $i_n^m$, which may located on different walls of the furnace, such as on all walls of the furnace 105. In FIG. 3, the symbol "i" in general refers to a combustion air inlet; the subscript (1, 2, or 3) refers to the vertical level of the air inlet, and the superscript (1, 2, or 3) refers to a particular air inlet at the vertical level indicated by the subscript. Typically, air may be fed from two, three, four, or five different vertical levels. Typically at each vertical level there are at least two, at least three, or at least four different locations, from which air is fed, e.g. at least one location on at least two walls at each vertical level. The total air supply is therefore divided, on one hand, to different vertical levels, and on the other hand, to different air inlets within these vertical levels. The flow of the air through the different air inlets $i_n^m$ at different levels n and locations m affect the quality of combustion of the liquor. Even if several levels and several different air inlets at each level are shown only in the context of FIG. 3, the air feed and inlets discussed above applies, in general, in all chemical recovery boilers, and thus to all embodiments.

Depending on the size of the droplets 152 and air flow within the furnace 105, some of the droplets fall onto the char bed 150 thereby forming a part of the char bed 150, and some of the droplets 152 may flow with flue gas towards the superheaters 210. The particles that flow with the flue gas are commonly referred to as carryover particles 153, and the phenomenon is referred to as carryover. Thus, carryover, may refer to one or more of the following: presence of carryover particles 153, change of an amount of carryover particles 153, and an amount of carryover particles 153.

The carryover particles 153 may adhere onto the surfaces of the superheaters 210 and in this way prevent heat transfer and/or clog the flue gas passages between the heat transfer pipes of the superheaters 210. In addition, carryover, when intermixed with fly ash, lowers a melting point of the fly ash. In this way, some of the fly ash may become liquid or viscous as a result of being mixed with carryover. The resulting compound is highly corrosive. Therefore, carryover increases also the risk of corrosion. In this way, preferably, the amount of carryover is minimized to such a low level that is practically possible.

Carryover is affected by a size of the droplets 152. Small droplets 152 tend to flow with flue gas upwards, while large droplets tend to fall by gravity onto the char bed 150. Therefore, the droplets 152 should not be too small to avoid carryover. In addition, the flow of gases and the temperature affects carryover.

In the pulp and paper industry, the recovery of sodium sulphide from the black liquor in the chemical recovery boiler is important to the pulp manufacturer, as the chemical is used in pulping to break the lignin of the fibres to produce pulp. In a Kraft pulp mill, the concentrated black liquor comprises sodium sulphate ($Na_2SO_4$) because of the sulphate process, and the chemical recovery boiler 100 converts a part thereof to sodium sulphide ($Na_2S$) according to the reaction

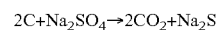

$$2C+Na_2SO_4 \rightarrow 2CO_2+Na_2S$$

A portion of the sodium sulphate that is reduced to sodium sulphide may be referred to as a reduction efficiency. With respect to a sulphite process, therein the chemical reaction for recovering the chemicals may be different. Moreover, the sulphite process can use calcium, ammonium, magnesium or sodium as a base, and the recovery reaction depends on the base material.

The reaction is not always perfect, whereby some of the sodium sulphate may remain unreacted in the char bed 150. In particular, a temperature of the char bed 150 affects the reduction, as does an oxygen content within the furnace. E.g.

supplying too much black liquor relative to combustion air feed may have the effect that a temperature of the char bed 150 will decrease. This, in effect, reduces a reduction efficiency of the chemical recovery boiler 100. Thus, the temperature of the char bed 150 should be in a designed range to ensure good reduction efficiency. Typically, a high temperature of the char bed 150 indicates high reduction efficiency. Typically, reduction starts at about 800° C., whereby a temperature of the char bed 150 is at least 800° C., preferably in the range of from 850° C. to 1100° C. A higher temperature may be problematic in view the material's thermal resistance. For example, a too hot char bed 150 may induce high thermal stress to the structures and/or the material may not be designed to withstand such high temperatures Thus, with a chemical recovery boiler, there is a simultaneous need for producing high amount of energy with good efficiency and high reduction efficiency. In order to control the combustion process, information on the quality of combustion of the liquor (black or brown liquor) in the chemical recovery boiler is needed. However, the quality of combustion is not always directly measurable.

In the invention, computational modelling is used to obtain information on the quality of combustion of the liquor (black or brown liquor) in the chemical recovery boiler 100.

In general, a computational model, be it based on computational fluid dynamics (CFD) or machine learning, receives values of parameters describing the process, and is configured to produce information on the quality of combustion of the liquor by computing using these values of the parameters. Only such a part of the chemical recovery boiler that affects the carryover the most needs to be modelled. However, more information may be obtainable, if also other parts are modelled. Thus, and with reference to FIG. 5a, it suffices to model only a furnace area of the chemical recovery boiler to obtain information of quality of combustion. However, with reference to FIGS. 5b and 1 to 3, even more accurate information may be obtainable, if the model covers both the furnace area of the chemical recovery boiler and a superheater area of the chemical recovery boiler.

As indicated above, the precise value of at least one of the parameters may be unknown, but assumed. Hereinafter, the at least one parameter, of which value(s) is/are only assumed, is/are referred to as a first input parameter. Thus, the value of the first input parameter may be e.g. a vector with one or more than one numerical components.

As indicated above, the precise value of at least one other of the parameters may be known accurately. Hereinafter, the at least one parameter, of which value(s) is/are known, is/are referred to as a second input parameter. Thus, the value of the second input parameter may be e.g. a vector with one or more than one numeral components. As for the division of several parameters to "first parameter" and "second parameter", herein the first parameter includes only such quantities of which value(s) is/are assumed, and correspondingly not accurately known. The quantities of which values are accurately known and used in the computational model form the second parameter.

Examples of the first input parameter include one or both of [A] a model particle size of black or brown liquor within the chemical recovery boiler and [B] a model deposit thickness on a superheater of the chemical recovery boiler. As for the alternative [B], preferably, the first parameter includes deposit thicknesses on all the superheaters of the chemical recovery boiler. Thus, examples of values of the first input parameter include a value or values of one, both, or all of [A] a model particle size of black or brown liquor within the chemical recovery boiler, [B] a model deposit thickness on a superheater of the chemical recovery boiler, and [C] model deposit thicknesses on each superheater of the chemical recovery boiler. With reference to FIGS. 5b and 1 to 3, the model deposit thickness on a superheater may be used in context of a model covering also a superheater area of the boiler. However, with reference to FIGS. 5a, 5b and 1 to 3, the model particle size may be used in context of a model covering at least a furnace area of the boiler. As for the alternative [A], i.e. the term "particle size", the particle size may refer to one or more than one statistical measures of a particle size distribution, including an average, a median, several percentile values, several differences of percentile values, variation and/or standard deviation. As detailed above, these values [A], [B], and [C] are neither known accurately nor measurable. However, an assumption can be made in any case. Moreover, these parameters are not constant in time, which makes their use even more problematic. It is not sufficient to optimize a value for these parameters only once, but instead, the value differs from one case to another and changes in time, as the process advances in the chemical recovery boiler. Thus, the correct value of this parameter changes as a result of the combustion process inside the chemical recovery boiler, even if the values of the other parameters (e.g. second input parameters) do not change in time.

Examples of the second input parameters concerning the furnace area of the chemical recovery boiler include one or more than one of the following: a first flow of combustion air through a first air inlet $i_{n1}^{m1}$ into the chemical recovery boiler and a second flow of combustion air through a second air inlet $i_{n2}^{m2}$ into the chemical recovery boiler (n1≠n2 and/or m1≠m2), an effective cross sectional area of the first air inlet $i_{n1}^{m1}$ and an effective cross sectional area of the second air inlet $i_{n2}^{m2}$, a temperature of combustion air at a first vertical level (110, 120, 130) and a temperature of combustion air at a second vertical level (120, 130, 110), a first flow of black or brown liquor into the chemical recovery boiler through a first injection gun 148, a second flow of black or brown liquor into the chemical recovery boiler through a second injection gun 148', a pressure in a drum 220 of the chemical recovery boiler, a dry matter content of the black or brown liquor that is fed into the chemical recovery boiler, a chemical content of dry matter of the black or brown liquor that is fed into the chemical recovery boiler, a heat value of the black or brown liquor that is fed into the chemical recovery boiler 100, a temperature of the black or brown liquor that is fed into the chemical recovery boiler 100, a pressure of the black or brown liquor that is fed into the chemical recovery boiler 100, a first angle of a first injection gun 148 that feeds the black or brown liquor into the chemical recovery boiler, a second angle of a second injection gun 148' that feeds the black or brown liquor into the chemical recovery boiler, a volumetric flow or a mass flow of concentrated non-condensable gases (CNCG) into the furnace of the chemical recovery boiler, a volumetric flow or a mass flow of another auxiliary fuel into the furnace of the chemical recovery boiler, and/or an oxygen content of flue gases.

The flow of combustion air through an air inlet, in combination with the effective cross sectional area of the air inlet, defines a velocity of the air flow. This affects the velocity profile of gases within the furnace. The pressure in the drum correlates positively with a temperature of the walls of the furnace of the boiler. In addition to the liquor, also auxiliary fuel(s) may be burnt in the furnace. Most commonly at least concentrated non-condensable gases (CNCG) are burnt. Other possible auxiliary fuels include soap, biosludge, methanol, stripper off-gas (SOG), and turpentine. Typically, the dry matter content of the black or brown liquor that is fed into the chemical recovery boiler and/or a chemical content thereof needs not to be measured continuously, but may be measured e.g. on monthly basis, or e.g. twice a year.

As for the temperature of the liquor that is fed to the boiler, as indicated in FIGS. 1 to 3, a heat exchanger 146 can be used to heat or cool the liquor that is fed to the boiler. The effect will be discussed below.

Examples of the second input parameters concerning the superheater area of the chemical recovery boiler include one or more than one of the following: a first temperature of the steam that is fed into a first superheater 212, a first pressure of the steam that is fed into a first superheater 212, a first mass flow of the steam that is fed into a first superheater 212, a second temperature of the steam that is fed into a second superheater 214, a second pressure of the steam that is fed into a second superheater 214, a second mass flow of the steam that is fed into a second superheater 214, a third temperature of the steam that is let out from the second superheater 214, which may be equal to the first temperature of the steam that is fed into the first superheater 212, a third pressure of the steam that is let out from the second superheater 214, which may be equal to the first pressure of the steam that is fed into the first superheater 212, a third mass flow of the steam that is let out from the second superheater 214, which may be equal to the first mass flow of the steam that is fed into the first superheater 212, a fourth temperature of the steam that is let out from the first superheater 212, a fourth pressure of the steam that is let out from the first superheater 212, a fourth mass flow of the steam that is let out from the first superheater 212, an outlet temperature and an outlet pressure of the superheated steam that is let out from a last superheater, wherein the last superheater is the last one of the superheaters of the boiler in the direction of flow of steam, typically before a steam turbine utilizing the steam, for each superheater (210, 212, 214, 320), a temperature, a pressure, and a flow of steam into the superheater as well as a temperature, a pressure, and a flow of steam out of the superheater, a weight of the first superheater 212, a weight of the second superheater 214, and/or a velocity of a velocity distribution of the gases in the superheater area.

As for flow of steam, the steam flows from one superheater to another, e.g. from the second superheater 214 to the first 212 (see FIG. 1) or from the first superheater 212 to the second 214 (not shown). The last superheater (see above) may be the first superheater 212, the second superheater 214, or the screen 320. In case a screen 320 is used as a superheater, in an embodiment, the screen 320 receives steam from the drum 220 and not through another superheater (not shown). In between different superheaters 212, 214, 320, water may be injected to the steam circulation in order to control the outlet temperature and/or the outlet pressure. Thus, the mass flow, the temperature, and/or the pressure of the steam may change between superheaters. A weight of a superheater may be measured e.g. using a strain gauge. The weight is indicative of total amount of deposit accumulated on the superheater. A velocity of the gas can be measured e.g. by an ultrasound detector, by a laser, or by using a pitot tube (i.e. a pitot probe).

A value of the second parameter comprises as many numeric components as the parameter itself. The value of the second parameter comprises the values of the aforementioned quantities.

In contrast to the first input parameter, a value of the second input parameter may be e.g. measured. All the second input parameters may be such parameters, of which value can be measured. Therefore, an embodiment comprises measuring a value for the second input parameter and entering the measured value of the second input parameter to the computational model. Moreover, it is possible that a value of the second parameter corresponds to such process parameters of the actual chemical recovery boiler that are adjustable. Therefore it is also possible that a value of the second input parameter is set by an operator both to the model and to the actual chemical recovery boiler. It is also possible that values of some components of the second input parameter are measured, and values of other components of second input parameter are set both to the model and to the actual chemical recovery boiler. Therefore, and embodiment comprises measuring a value for a component of the second input parameter, and entering the value of the second input parameter to the model. Moreover, the embodiment or another embodiment comprises determining a value for a component of the second input parameter, entering the value of the second input parameter to the model, and controlling the actual chemical recovery boiler accordingly, i.e. in such a way that the value of the process parameter corresponds the value of the second input parameter. Other methods for controlling the chemical recovery boiler will be detailed below.

Figure 6:
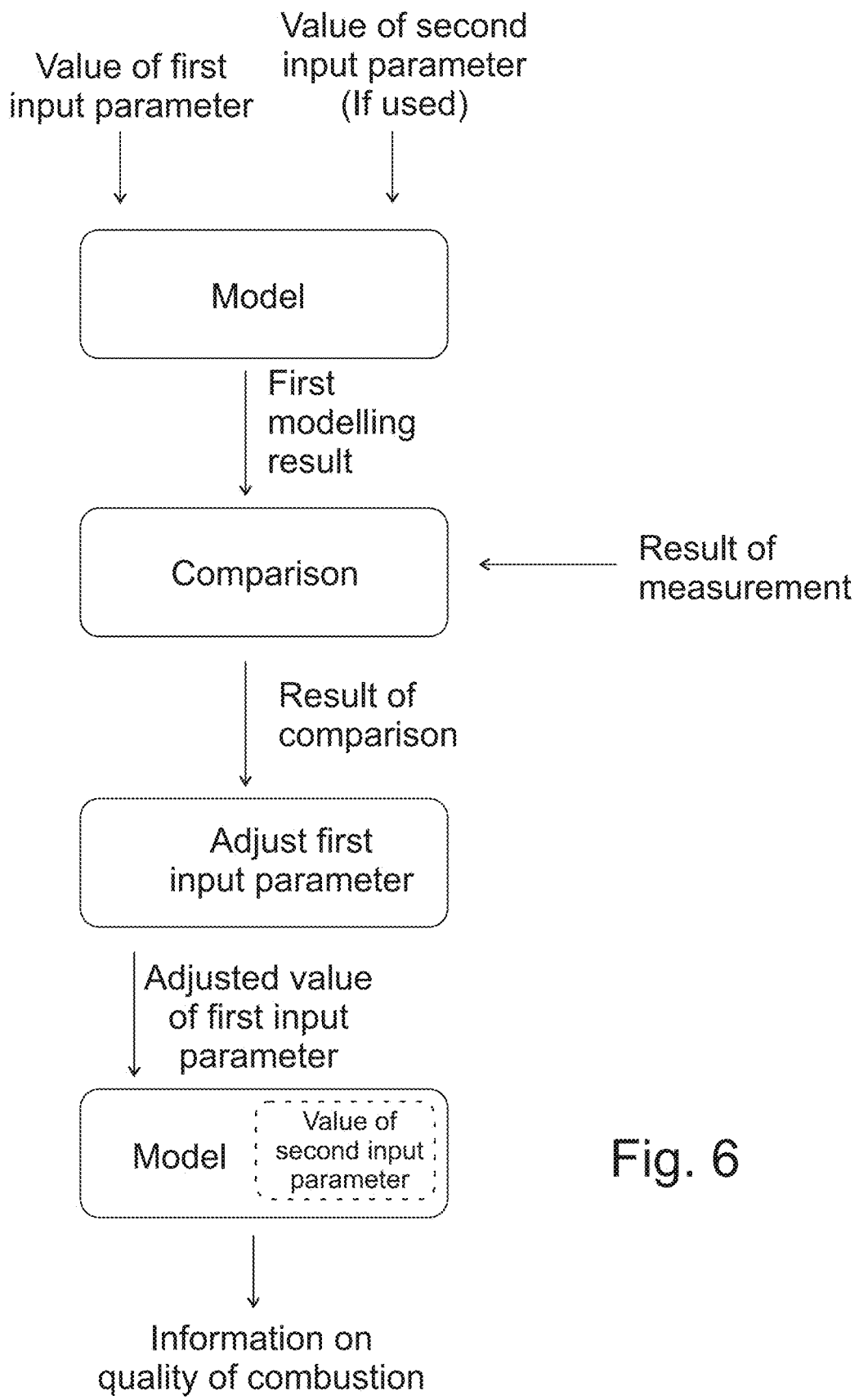
FIG. 6 shows a method for obtaining information on quality of combustion of a liquor in a chemical recovery boiler, wherein a modelling result is compared with a measurement result.

Referring to FIG. 6, the method comprises entering the value of the first input parameter to the computational model configured to determine, based on the value of the first input parameter, a value of the quality of combustion of the liquor in the chemical recovery boiler. Herein the term "entering" includes all means for feeding the model with value of the first parameter. After entering the value to the model, the method comprises, at a first time, running the computational model to obtain a first modelling result. The first modelling result is related to the quality of combustion of liquor in the chemical recovery boiler, however, because of inaccurate values of first input parameters, the first modelling result may be inaccurate.

As indicated above, in addition to the value of the first parameter, of which values are not accurately known, the computational model may use a value of the second parameter, of which values are accurately known. Thus, and with reference to FIG. 6, an embodiment of the method comprises entering the value of the first input parameter and the value of the second input parameter to the computational model configured to determine, based on the values of the first and second input parameters, a value of the quality of combustion of the liquor in the chemical recovery boiler. Herein the term "entering" includes all means for feeding the model with the values of the first and second parameters. After entering the values to the model, the method comprises, at the first time, running the computational model to obtain the first modelling result.

Figure 5A:
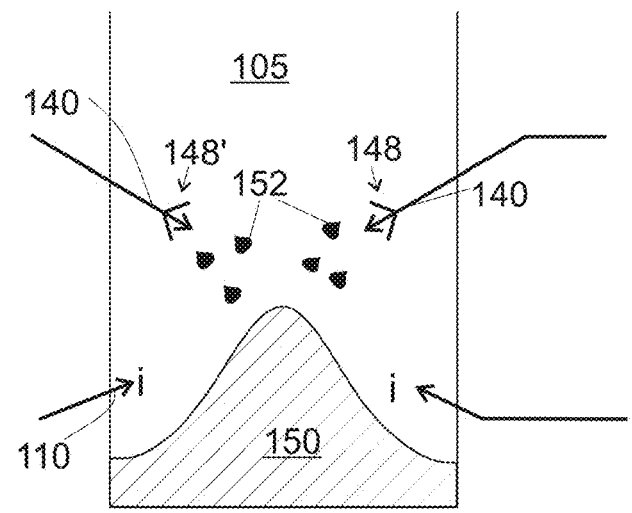
FIG. 5a shows a furnace area of a chemical recovery boiler, covered by a computational model.

In an embodiment, the computational model is based on fluid dynamics. In an embodiment, the computational model is a reduced model, such as a data-driven neural network model. Such a reduced model may be taught e.g. using data obtainable from fluid dynamics computations. In a preferable embodiment, the computational model is based on fluid dynamics and includes a part for calculating the value of the quality of combustion from the results of fluid dynamics computations. The model may cover the whole chemical recovery boiler (FIGS. 1 to 3), a furnace area and a superheater area only (FIG. 5b), or a furnace area only (FIG. 5a).

The term quality of combustion of the liquor in the chemical recovery boiler may refer to one or several aspects of the combustion process inside the chemical recovery boiler, including: growth rate of a size of the char bed 150, presence of carryover particles at the location of the first superheater 212, amount of carryover particles at the location of the first superheater 212, evenness of flue gas flow and/or temperature through the superheaters 210, content of carbon monoxide (CO) of the flue gases exiting the furnace area of the boiler, content of a nitrogen oxide (NOx) of the flue gases exiting the furnace area of the boiler, a temperature profile of the flue gases exiting the furnace area of the boiler, a velocity profile of the of the flue gases exiting the furnace area of the boiler, heat flux distribution to walls of the furnace of the chemical recovery boiler, accumulation of droplets of the black (or brown) liquor to furnace walls of the chemical recovery boiler, a location and size of ash sticky area within the chemical recovery boiler, and/or reduction efficiency within the char bed 150.

Regarding reduction efficiency, the efficiency may be calculated based on a temperature profile and an oxygen content profile in the vicinity of the char bed. As detailed above, the computational model may include a primary part for calculating combustion process conditions (e.g. gas temperature and velocity profiles) and a secondary part for calculating a quality of combustion of a liquor from the combustion process conditions.

In particular, the term "quality of combustion of the liquor in the chemical recovery boiler" may refer to the same quantity that is measured or derived from the measurements. However, the quality may be computed from intermediate results of the model.

Referring to FIG. 6, the method comprises measuring, from the chemical recovery boiler, a value indicative of carryover, to obtain a measurement result (i.e. result of measurement in FIG. 6).

The value indicative of carryover may be indicative of, by way of examples: presence of carryover particles 153 within a cross section A of the furnace at a location 11, 13, change of an amount of carryover particles 153 within the cross section A of the furnace at the location 11, 13, and/or an amount of carryover particles 153 within the cross section A of the furnace at the location 11, 13.

The location 11, 13 is downstream from an injection gun 140, 148' that is configured to feed black or brown liquor into the chemical recovery boiler 100. Preferably, the location 11, 13 is also upstream from a superheater 210, 212, 214, 320. More preferably, the location 11, 13 is also upstream from the first superheater 212, which has been defined above.

In an embodiment, the value indicative of carryover is measured directly with a carryover detector. Examples of carryover detectors include a carryover camera (or a combination of several carryover cameras) and a carryover probe. The carryover probe may be used in connection with image detection. From such images, the presence and/or amount of carryover particles 153 can be detected.

In an embodiment, the value indicative of carryover is measured indirectly. For example, a decreasing char bed 150 may be indicative of carryover, since when the char bed decreases, it does not receive as much droplets 152 as desired. Moreover, a temperature profile within a cross section of the furnace may be indicative of carryover. A too high a temperature and/or a too much varying temperature profile may be indicative of carryover.

Therefore, in an embodiment, the value indicative of carryover is measured by measuring, from the chemical recovery boiler, one or both of [A] a size of a char bed 150 and [B] a temperature or a temperature profile at a location 11, 13 that is downstream from a liquor injection gun 148 of the chemical recovery boiler, the liquor injection gun 148 being configured to feed the liquor that is burnt into the chemical recovery boiler, and upstream from a superheater of the chemical recovery boiler, in the direction of flow of flue gases in the chemical recovery boiler, to obtain a measurement result. Herein the term "size" refers to height or volume of the char bed 150. Preferably, the volume of the char bed 150 is measured.

It has been found that at least these measurements (both in isolation from one another and in combination) can provide vital inform on the combustion process inside the chemical recovery boiler. Moreover, these values are measurable. Regarding the size of the char bed 150, a camera or cameras 410, 420, 430 can be used to measure the size of the char bed 150, as indicated in FIGS. 2 and 3. For example the term "size" may relate to a local height, or an average height, which may be measured with one camera only. Preferably, the "size" refers to volume, which can be determined by using at least two cameras imaging the char bed from two different angles. Regarding the temperature or temperature profile at the location 11 or 13, the temperature profile can be measured with a thermometer 310 as indicated in FIGS. 1 and 3. The thermometer may be based on acoustic pyrometry. Other possibilities will be detailed below. The term temperature profile refers to multiple values of temperature on a two dimensional surface within the chemical recovery boiler. The temperature profile may be measured e.g. on a cross sectional plane A of the chemical recovery boiler. A surface normal of the plane A may be substantially parallel with an average direction of flow of flue gases within the boiler at the location of the plane A.

When a camera 410 or cameras 410, 420, 430 is/are used to measure the size of the char bed 150, preferably, the camera or cameras, optionally in connection with a processing unit, is/are configured to measure also a temperature of the char bed 150. Thus, the camera or cameras 410, 420, 430 may act as a pyrometer. This has the effect that information on also the temperature of the char bed 150 is obtained. As detailed above, a proper temperature of the char bed 150 is needed for good reduction.

Figure 7:
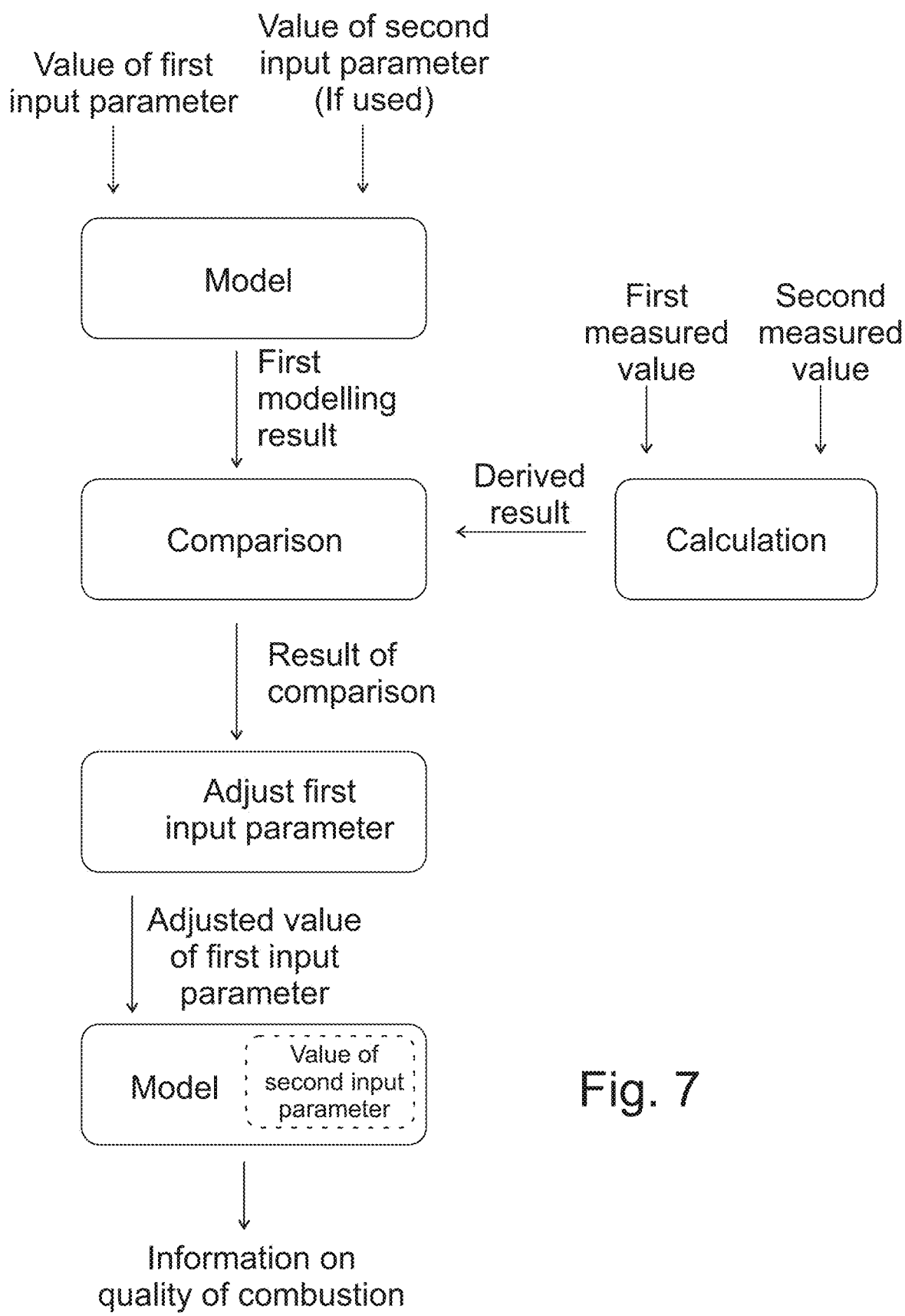
FIG. 7 shows a method for obtaining information on quality of combustion of a liquor in a chemical recovery boiler, wherein a modelling result is compared with a result derived from a measurement result.

Referring to FIGS. 6 and 7 the method comprises comparing the first modelling result with [A] the measurement result or [B] a result derived from the measurement result, to obtain a primary comparison result. In the embodiment of FIG. 6, the first modelling result is compared directly with a measurement result (i.e. "Result of measurement"). In the embodiment of FIG. 7, the first modelling result is compared with a result derived from the measurement result (i.e. "Derived result"). The result derived from the measurement result may be derived also from another measurement. E.g. a growth rate of the char bed 150 may be derived from two measured sizes.

Different possible interpretations for the term "quality of combustion of the liquor in the chemical recovery boiler" have been detailed above. It is noted that the first modelling result, as discussed above, need not be the quality of the combustion of the liquor in the chemical recovery boiler. However, the first modelling result is [i] comparable with the measurement result or the result derived therefrom, and [ii] usable for determining the quality of combustion.

Thus, the first modelling result may include at least one of: growth rate of a size of the char bed 150, presence of carryover particles at the furnace area, amount of carryover particles at the furnace area, and/or a temperature profile at the furnace area, Referring to FIGS. 6 and 7, the method comprises adjusting the value of the first input parameter based on the primary comparison result to obtain an adjusted value of the first input parameter; entering the adjusted value of the first input parameter to the computational model; and thereafter, at a second time, running the computational model to obtain the information on quality of combustion of the liquor in the chemical recovery boiler. If the value of the second parameter is used, in an embodiment, the value of the second parameter is not adjusted based on the primary comparison result. However, it may be adjusted for other reasons, e.g. if the value changes for some other reason, e.g. due to an actual control of air flow into the boiler or when determining how a planned control procedure would affect the quality of the combustion.

The information on quality of combustion of the liquor in the chemical recovery boiler thus obtained is more accurate than what is derivable from the first modelling result, since the value of the first parameter is adjusted before the second time. Moreover, even if the value of the second parameter is used, the value of the second parameter need not be entered to the model again, since the model may remember the value of the second parameter. In the alternative, if any component of a value of the second parameter (see above for examples) changes, also the value of the second parameter may be adjusted before the second time.

As for the relation of the first modelling result and the quality of combustion of the liquor in the chemical recovery boiler, it is noted, that when running the computational model at the second time, an adjusted first modelling result (or a second modelling result) is computed. The adjusted first modelling result typically describes the combustion process more accurately than the first modelling result. However, adjusted first modelling result, is not necessarily per se the quality of combustion of the liquor in the chemical recovery boiler. Instead, further computation may be needed to compute the quality of combustion of the liquor in the chemical recovery boiler from the adjusted first modelling result. However, already the adjusted first modelling result per se may be considered to describe quality of combustion of the liquor in the chemical recovery boiler.

In general, the measurement result is a value of a parameter underlying the measurement result. In the method, the first input parameter, of which value is adjusted, is neither the parameter that is measured nor the parameter underlying the result derived from the measurement. Moreover, in order to enable meaningful comparisons, the first modelling result describes also the measurement result or the result derived from the measurement result.

With reference to FIGS. 1, 2, 3, 4a, and 4b, in an embodiment, the computational model is a model describing the area of the furnace 105, the area of the superheaters 210, and the area in between the furnace 105 and the superheaters. With reference to FIG. 5b, in an embodiment, the computational model is a model describing the area of the furnace 105 and the area of the superheaters 210, but not the area in between the furnace 105 and the superheaters. With reference to FIG. 5a, in an embodiment, the computational model is a model describing the area of the furnace 105 only. In the embodiments of FIGS. 1 to 4 and 5b, the computational model takes into account at least a furnace area of the chemical recovery boiler and a superheater area of the chemical recovery boiler. In the embodiments of FIGS. 1 to 4 and 5b, the computational model comprises a first part describing the furnace area inside the chemical recovery boiler and a second part describing a superheater area inside the chemical recovery boiler. Moreover, an output of the first part is used as an input for the second part.

Referring to FIGS. 1, 2, 3, 4a, and 4b, if a single model based on CFD is used to describe the area of the furnace 105, the area of the superheaters 210, and the area in between the furnace 105 and the superheaters 210, then a first part of the model describes the furnace area inside the chemical recovery boiler and a second part of the model describes a superheater area inside the chemical recovery boiler. Moreover, following the principles of CFD, the output of the first part is used as an input for the second part naturally in the computations.

Referring to FIG. 5b, if the model comprises two partial CFD models, wherein a first part is used to describe only the area of the furnace 105 and a second part is used to describe only the area of the superheaters 210, whereby CFD is not used to model the part in between these areas, the output of the first part may be used as an input for the second part. This approach typically saves computation time compared to the full model of FIGS. 1, 2, 3, 4a, and 4b.

Preferably, the computational model is configured to model combustion conditions inside the chemical recovery boiler and to compute the value of the quality of combustion of a liquor in a chemical recovery boiler by using the thus modelled combustion conditions inside the chemical recovery boiler. Such a computational model may be based on computational fluid dynamics (CFD), wherein the CFD is used to model the combustion conditions inside the chemical recovery boiler. The quality of combustion of a liquor in a chemical recovery boiler may be one of the combustion conditions or a value derived from the combustion conditions. The combustion conditions inside the chemical recovery boiler, within a furnace area, comprise one or more than one of: presence of carryover particles, amount of carryover particles, temperature in a vicinity of a char bed, content of oxygen ($O_2$) in a vicinity of the char bed, a size of the char bed, a temperature profile of gases, variance of a temperature profile of gases, symmetry of a temperature profile of gases, a flow velocity profile of gases, variance of a flow velocity profile of gases, heat flux through walls of the furnace of the chemical recovery boiler, black (or brown) liquor droplet accumulation on walls of the furnace of the chemical recovery boiler, content of carbon monoxide (CO), content of oxygen ($O_2$), and/or content of nitrogen oxide (NOx).

The combustion conditions inside the chemical recovery boiler, at the superheater area, comprise one or more than one of: presence of carryover particles, amount of carryover particles, a temperature profile of gases, variance of a temperature profile of gases, symmetry of a temperature profile of gases, a temperature profile of a surface of a superheater, a flow velocity profile of gases, variance of a flow velocity profile of gases, turbulence of flow velocity of gases, a location and size of ash sticky area, content of carbon monoxide (CO), content of oxygen ($O_2$), and/or content of nitrogen oxide (NOx).

Hereinabove, the term "a temperature profile of a surface of a superheater" refers to a temperature of the deposit on the superheater, if any.

For example, a growth rate of char bed, which may be the first modelling result that is compared with a result derived from measurements, can be calculated once the amount of liquor, the air flow at different vertical levels, the size (distribution) of liquid droplets, and the content of the liquid droplets is known. A growth rate of char bed may be calculated e.g. by calculating the size of the char bed at two modelled instances of time, and computing the difference.

Referring to FIG. 7, in an embodiment, the first modelling result is compared with a result derived from the measurement result and another measurement result. A concrete example of an embodiment of FIG. 7 is one, in which the first modelling result includes the growth rate of the char bed 150. Moreover, as discussed above, the particle size or size distribution of black or brown liquor within the chemical recovery boiler is not accurately known. Thus, in this embodiment, the first input parameter comprises a model particle size or size distribution of black or brown liquor within the chemical recovery boiler. Correspondingly, the value of the first input parameter comprises a value of a model particle size of black or brown liquor within the chemical recovery boiler, or values of more than one statistical measures of the particle size distribution. Examples of such statistical measures have been detailed above. As a side note, the char bed is within the furnace area of the boiler. Thus, in this embodiment, the computational model covers a furnace area of the boiler (see FIG. 5a), and may cover also other areas (see FIGS. 5b and 1 to 4b).

Since the first modelling result includes the growth rate of the char bed 150, the result derived from the measurement result is also a growth rate of the char bed 150. Thus, the embodiment comprises: measuring a first size of a char bed 150 inside the chemical recovery boiler 100 at a first instance of time, measuring a second size of the char bed 150 at a second instance of time, and determining a true growth rate of the char bed 150 using the first size and the second size.

When determining the true growth rate, the difference between the second and first instances of time may also be used.

Moreover, the value of the first parameter, which includes at least model particle size or size distribution of black or brown liquor is entered to the computational model to obtain the first modelling result describing the growth rate of the char bed, which in this embodiment is the quality of combustion of the liquor in the chemical recovery boiler. In this way, the embodiment comprises determining a model growth rate of the char bed using the first modelling result. Before the model is run, a value of a second parameter, which includes values of accurately known parameters (e.g. air flow, content of liquor, and liquor feed) may be entered to the model.

The embodiment comprises comparing the true growth rate of the char bed with the model growth rate of the char bed to obtain a first comparison result, and adjusting the value of the model particle size (i.e. the value of the first parameter) based on the first comparison result to obtain the adjusted value of the first parameter.

As detailed above, the adjusted value of the first parameter is thereafter entered into the computational model and the model is re-run to obtain more accurate information on the quality of combustion of the liquor in the chemical recovery boiler.

As for adjusting the value of the first parameter, which in this embodiment is the value of the model particle size, in case the true growth rate is more than the model growth rate, this implies that the value of the model particle size is too small, since in the model the small particles flow with the flue gas, while in reality larger particles fall on the char bed. Adjusting is done accordingly. Thus an embodiment comprises determining that the true growth rate is more than the model growth rate and the step of adjusting the value of the first input parameter comprises increasing the value of the model particle size. Moreover, the opposite is also true, whereby an embodiment comprises determining that the true growth rate is less than the model growth rate and the step of adjusting the value of the first input parameter comprises decreasing the value of the model particle size. As indicated already above, the value of the first input parameter is adjusted based on the primary comparison result to obtain an adjusted value of the first input parameter.

Referring to FIGS. 2 and 3, the size of the char bed may be measured using a camera 410 or cameras 410, 420, 430. Preferably, the growth rate of the char bed 150 is measured by determining, at a first instance of time, a first value indicative of the volume of the char bed and at a second instance time, a second value indicative of the volume of the char bed and by determining the growth rate from these values. When a value indicative of a volume of the char bed, least two cameras are used to measure the value. The volume of the char bed may be determined e.g. from the images of the cameras.

Figure 4A:
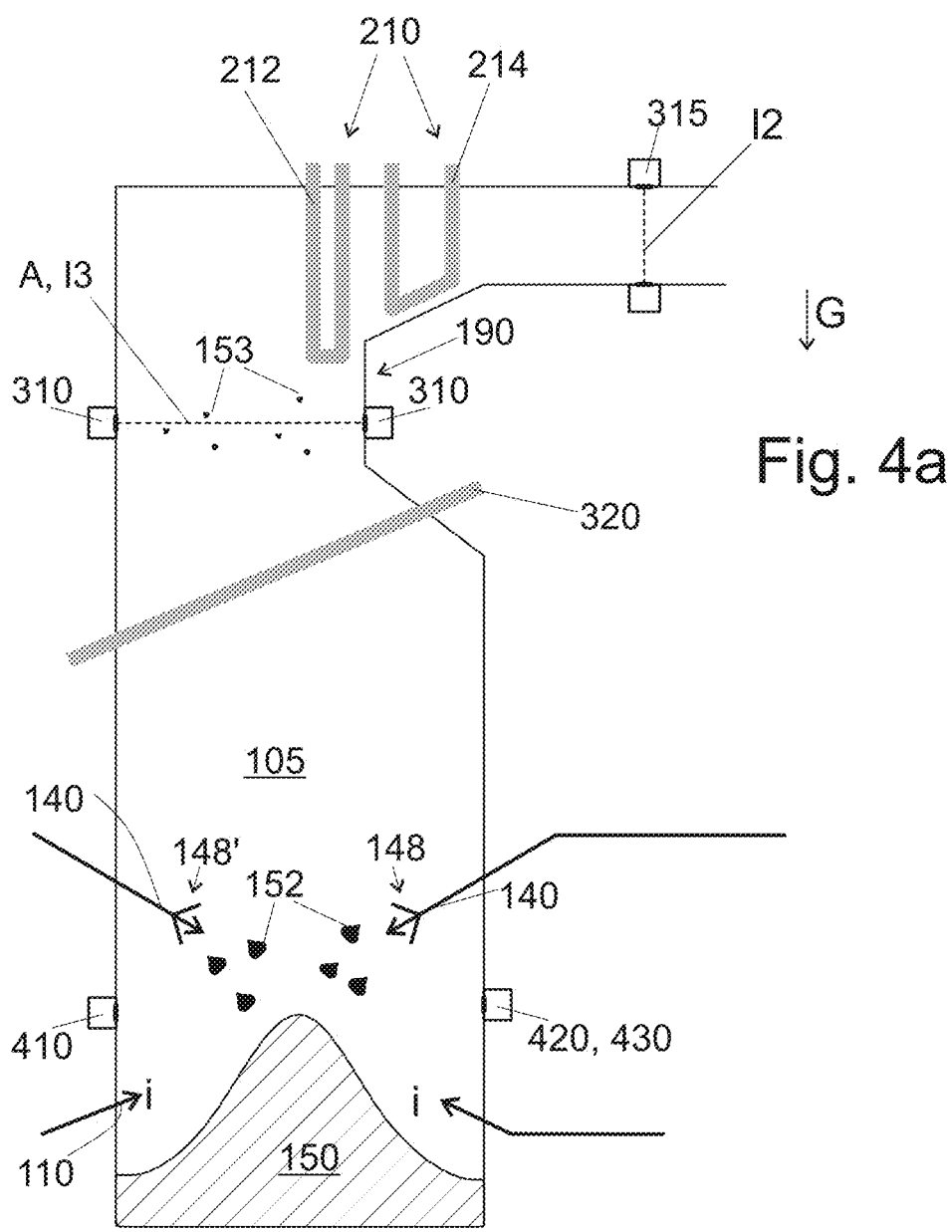
FIG. 4a is a principal side view of a chemical recovery boiler having a thermometer for measuring a temperature profile, cameras for measuring a size of a char bed, and a screen.
Figure 4B:
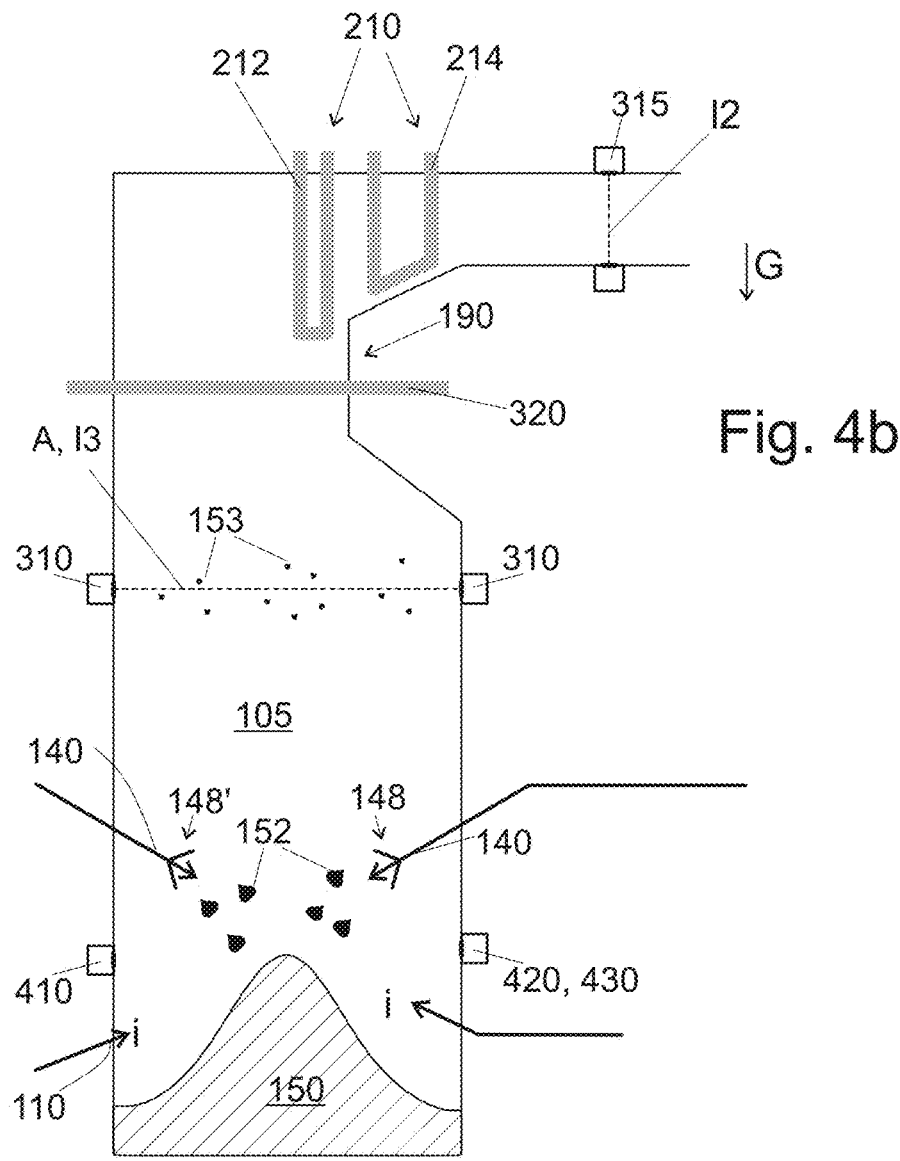
FIG. 4b is a principal side view of a chemical recovery boiler having a thermometer for measuring a temperature profile, cameras for measuring a size of a char bed, and a screen.
Figure 5B:
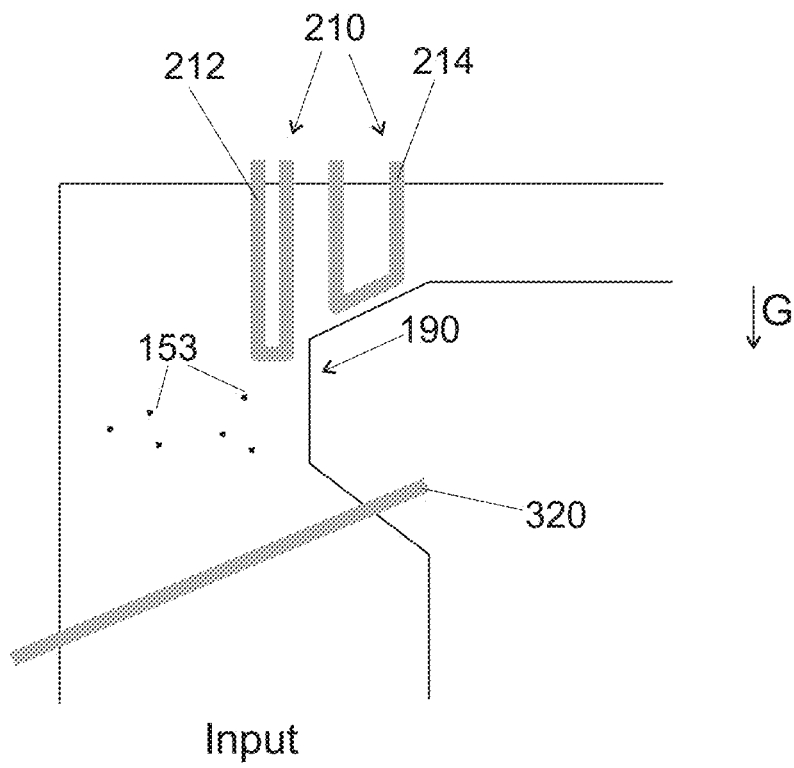
FIG. 5b shows areas of a chemical recovery boiler to be covered by a parts of a computational model and connecting the two parts of the computational model.
Figure 5B:
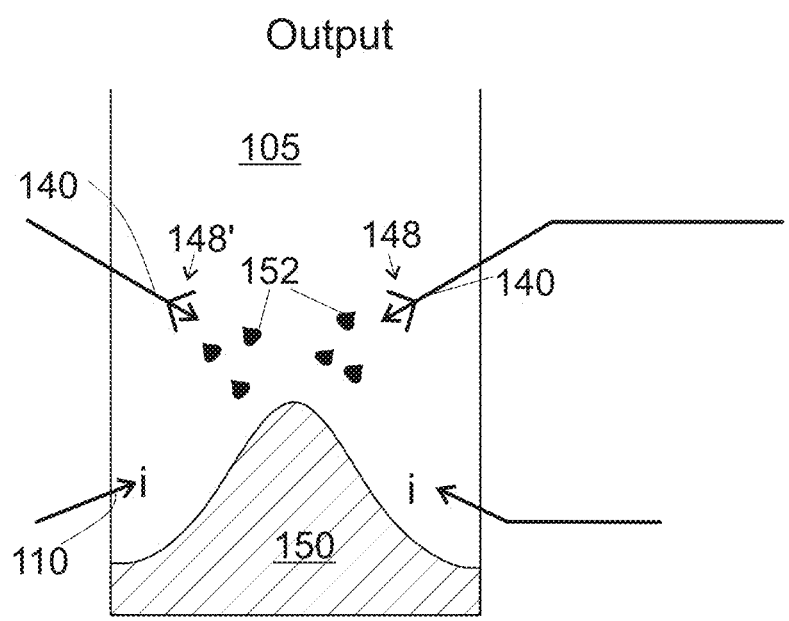

Another concrete example, not mutually exclusive with the previous example, but combinable therewith, is related to FIGS. 6, 4a, and 4b. As indicated above, carryover is another parameter related to quality of combustion. Moreover, it has been noticed that the temperature or temperature profile in the chemical recovery boiler at a location (l1, l3) that is arranged, in the direction of flow of gases inside the chemical recovery boiler, downstream from an injection gun 148, 148' that is configured to feed black or brown liquor into the chemical recovery boiler and upstream from a superheater 210, correlates with carryover. For example, a high variation of the temperature profile is indicative of the presence of carryover particles at the aforementioned location. As another example, a high temperature is indicative of the presence of carryover particles at the aforementioned location. As a side note, the location (l1, l3) may be in the furnace area of the boiler (see FIG. 5a) or in the superheater area of the boiler (see FIG. 5b, upper part). Thus, in this embodiment, the computational model covers a furnace area of the boiler, and may cover also other areas.

Therefore, in an embodiment, the value of the first input parameter comprises a value of a model particle size of black or brown liquor within the chemical recovery boiler; or values of more than one statistical measures of the particle size distribution. Moreover, the embodiment comprises measuring a true temperature profile at a location l3. Some possible locations l3 are depicted in FIGS. 3, 4a and 4b. The location l3 is arranged in the direction of flow of gases inside the chemical recovery boiler, downstream from an injection gun 148, 148' that is configured to feed black or brown liquor into the chemical recovery boiler and upstream from a superheater (e.g. 212 in FIG. 4a; and 212 and 320 in FIG. 4b). The true temperature profile is measured with a thermometer 310 that is configured to measure the temperature profile from the location l3.

The embodiment comprises determining a model temperature profile at the location l3 using the first modelling result; comparing the true temperature profile at the location l3 with the model temperature profile at the location l3 to obtain a second comparison result, and adjusting the value of the model particle size based on the second comparison result.

Even if a location l2 and another thermometer 315 is shown in FIGS. 4a and 4b, as indicated above, these are not needed in an embodiment, wherein the true temperature profile at a location l3 is used as indication of carryover.

The true temperature profile at the location l3 can be measured by one or more of acoustic pyrometry, optical pyrometry, a suction pyrometer, laser spectroscopy, and thermometers. Preferably, the true temperature profile at the location 13 is measured by acoustic pyrometry. It has been found that acoustic pyrometry can provide accurate results even in the highly fluctuating environment inside a chemical recovery boiler. Moreover, the components of an acoustic pyrometer (i.e. sound sources and sound detectors) are not as sensitive to deposit accumulation as e.g. optical components. When acoustic pyrometry is used, a time of flight of an acoustic signal is correlated with a temperature inside the boiler. Moreover, by using at least two sound sources and at least four sound detectors, a two-dimensional profile of the temperature is measurable.

Another concrete example, not mutually exclusive with either of the previous examples, but combinable with one or both of them, is related to FIGS. 6, 1, and 3. As indicated above, a temperature profile of a surface of a superheater is another parameter related to quality of combustion. However, a deposit thickness affects this a lot. Deposit thickness determines the efficiency of the superheaters, i.e. how rapidly the temperature of the flue gases drop. In general a thick layer of deposit increases the temperature on the superheaters. In addition, the deposit thickness affects a pressure loss of the flue gases within the superheater area, thereby affecting the flow distribution at the superheater area, which further affects the sticky ash region. When deposits accumulate, the sticky ash region moves towards boiler bank, which affects the functioning of also the boiler bank.

For these reasons, in an embodiment, the value of the first input parameter comprises a value of a model deposit thickness on a superheater of the chemical recovery boiler. More preferably, the value of the first input parameter comprises values of model deposit thicknesses on each superheater of the chemical recovery boiler. The method comprises measuring a true temperature or a true temperature profile at a location 11 (see FIGS. 1 and 3). The location 11 is arranged, in the direction of flow of gases inside the chemical recovery boiler, downstream from an injection gun 148 that is configured to feed black or brown liquor into the chemical recovery boiler and upstream from a superheater 212. The location 13 of FIGS. 4a and 4b may also serve as the location 11, whereby the location 11 may be arranged upstream or downstream from screen 320, if a screen is used. As a side note, the deposit thickness on superheaters relate to a superheater area of the boiler (FIG. 5b, upper part and/or FIGS. 1 to 4b). Thus, in this embodiment, the computational model covers a superheater area of the boiler, and preferably also the furnace area of the boiler.

The method comprises measuring a true temperature or true temperature profile at a location 12, wherein the location 12 is arranged such that at least a superheater (212, 214) is arranged in between the location 11 and the location 12 in the direction of flow of gases inside the chemical recovery boiler. Preferably, at least such a superheater, of which at least a part is arranged above the bullnose 190 is arranged in between the location 11 and the location 12 in the direction of flow of gases inside the chemical recovery boiler.

The embodiment comprises determining a true temperature difference using the true temperature or true temperature profile at the location 11 and the true temperature or true temperature profile at the location 12.

The embodiment comprises determining: a model temperature or temperature profile at the location 11 using the first modelling result, a model temperature or temperature profile at the location 12 using the first modelling result, and a model temperature difference using the model temperature or temperature profile at the location 11 and the model temperature or temperature profile at the location 12.

Furthermore, the embodiment comprises comparing the true temperature difference with the model temperature difference to obtain a third comparison result, and adjusting the value of the model deposit thickness on the superheater based on the third comparison result.

In case the value of the model deposit thickness is higher than its actual value, in the model, heat is not recovered well in the superheaters, whereby the model temperature difference may be higher than the true temperature difference. Thus, a proper adjustment would be to decrease the value of the model deposit thickness on a superheater of the chemical recovery boiler.

Therefore, an embodiment comprises determining that the true temperature difference is more than the model temperature difference, and increasing the value of the model deposit thickness on a superheater of the chemical recovery boiler. Correspondingly, an embodiment comprises determining that the true temperature difference is less than the model temperature difference, and decreasing the value of the model deposit thickness on a superheater of the chemical recovery boiler.

The true temperature or temperature profile at the location 11 can be measured by one or more of acoustic pyrometry, optical pyrometry, a suction pyrometer, laser spectroscopy, and a thermometer (for the temperature) or thermometers (for the temperature profile). Preferably, the true temperature profile at the location 11 is measured by acoustic pyrometry. The locations 11 and 13 may be the same.

The true temperature or temperature profile at the location 12 can be measured one or more than one of acoustic pyrometry, optical pyrometry, suction pyrometer, laser spectroscopy, and/or a thermometer or thermometers. In an embodiment, a temperature profile comprising the temperature at the location 12 is measured. In an embodiment, a temperature profile comprising the temperature at the location 12 is measured using acoustic pyrometry.

In addition to the true temperature at the location 12, several other temperatures at that location may be measured in order to obtain a temperature profile at the location 12.

A further concrete example, not mutually exclusive with the previous examples, but combinable therewith, is related to measuring carryover directly. Preferably carryover is measured from such a location (11, 13) that is arranged, in the direction of flow of gases inside the chemical recovery boiler, downstream from an injection gun 148, 148' that is configured to feed black or brown liquor into the chemical recovery boiler and upstream from a superheater 210. As a side note, the location (11, 13) may be in the furnace area of the boiler (see FIG. 5a) or in the superheater area of the boiler (see FIG. 5b, upper part). Thus, in this embodiment, the computational model covers a furnace area of the boiler, and may cover also other areas.

When carryover (e.g. amount of carryover particles) is measured directly, it can be compared with the first modelling result.

In case more carryover is observed that what the first modelling result indicates, this implies that the value of the model particle size is too large, since in the model the large particles do not flow with the flue gas, while in reality smaller particles flow upwards as carryover. Adjusting is done accordingly.

Thus an embodiment comprises determining that the true amount of carryover is more than the model amount of carryover and the step of adjusting the value of the first input parameter comprises decreasing the value of the model particle size. Moreover, the opposite is also true, whereby an embodiment comprises determining that the true amount of carryover is less than the model amount of carryover and the step of adjusting the value of the first input parameter comprises increasing the value of the model particle size.

In case carryover, in particular the change of amount of carryover particles, is measured directly, this result can also be compared with the first modelling result. What has been said above in connection with measuring the amount of carryover particles applies mutatis mutandis.

Figure 8:
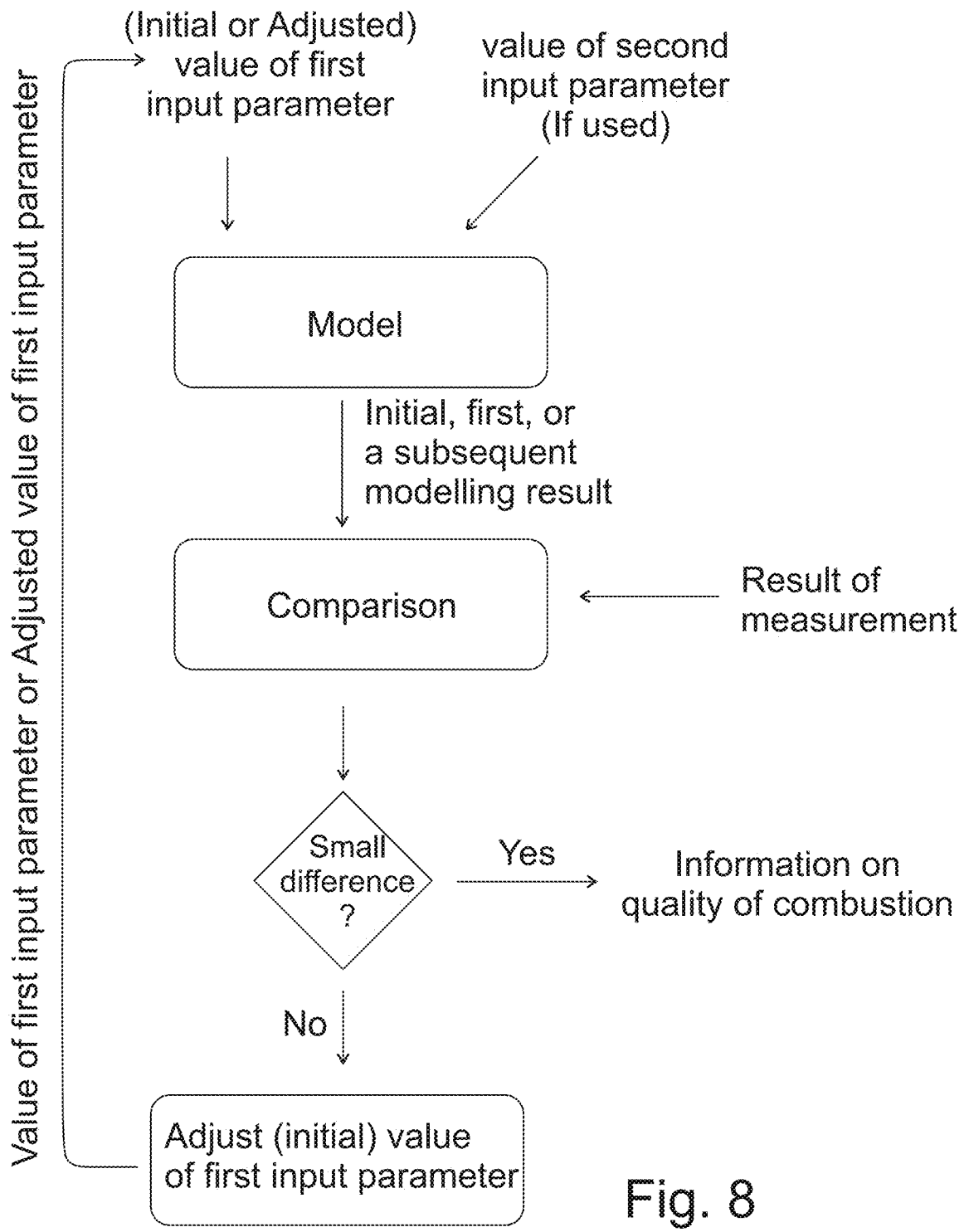
FIG. 8 shows an iterative method for obtaining information on quality of combustion of a liquor in a chemical recovery boiler, wherein a modelling result is compared with a measurement result.

Referring to FIG. 8, the method can also be used in an iterative manner. In other words, the value of the first input parameter may be adjusted more than one time, and the computational model may be run more than twice to obtain even more accurate information on quality of combustion of a liquor in a chemical recovery boiler. For example, the value of the first input parameter may be adjusted twice and the computational model may be run three times. In such a case, the iteration is stopped after a predetermined number of adjustments. As an alternative, the process may be iterated as long as the modelling result differs from the measured result (or the result derived therefrom), or until the modelling result does not become any better even if iterated.

Correspondingly, and with reference to FIG. 8, the value of the first input parameter as indicated above, may be a result of adjusting an initial value of the first parameter.

Thus, an embodiment comprises before entering the value of the first input parameter to the computational model: entering an initial value of the first input parameter to the computational model, running the computational model to obtain an initial modelling result describing the quality of combustion of the liquor in the chemical recovery boiler, comparing the initial modelling result with [a] the measurement result or [b] a result derived from the measurement result, to obtain an initial comparison result, and adjusting the initial value of the first input parameter based on the primary comparison result to obtain the value of the first input parameter.

However, if the criterion for ending the iteration is that the modelled results differ only a little from the true results, the computational model is run, at the second time, only if the difference between the modelled results and the true results exceed a threshold. Correspondingly, an embodiment comprises determining that the primary comparison result exceeds a threshold. While this applies to running the model at the second time, such comparison may be done to determine whether the model needs to be run for a third time, fourth time, and so on mutatis mutandis.

The information on quality of combustion of a liquor in a chemical recovery boiler thus obtained can be used to control a chemical recovery boiler. Thus, a method for controlling a chemical recovery boiler comprises: obtaining information on quality of combustion of a liquor in a chemical recovery boiler as detailed above, and controlling the chemical recovery boiler using the information on the quality of combustion of the liquor in the chemical recovery boiler.

The step of controlling can be performed by an operator, e.g. a human operator, or automatically, e.g. by an electronic control unit. In an embodiment, the step of controlling the chemical recovery boiler is carried out by an electronic control unit, such as a microcontroller.

Controlling the chemical recovery boiler may comprise controlling at least one of the following: a temperature of the black liquor or brown liquor that is fed into the furnace of the chemical recovery boiler, a pressure of the black liquor or brown liquor that is fed into the furnace of the chemical recovery boiler, an angle of an injection gun 148 configured to feed liquor into the chemical recovery boiler, a first angle of a first injection gun 148 independent of a second angle of a second injection gun 148', a flow of the black or brown liquor through the injection gun 148, a first flow of the black or brown liquor through a first injection gun 148 independent of a second flow of the black or brown liquor through a second injection gun 148', a flow of combustion air into the furnace, a flow of combustion air through a first air inlet $i_{n1}^{m1}$ independent of a flow of combustion air through a second air inlet $i_{n2}^{m2}$ (n1≠n2 and/or m1≠m2), an effective cross sectional area of a first air inlet $i_{n1}^{m1}$ independent of an effective cross sectional area of a second air inlet $i_{n2}^{m2}$ (n1≠n2 and/or m1≠m2), a temperature of combustion air through a first air inlet $i_{n1}^{m1}$, and/or a temperature of combustion air through a first air inlet $i_{n1}^{m1}$ independent of a temperature of combustion air through a second air inlet $i_{n2}^{m2}$ (n1≠n2 and/or m1≠m2).

The temperature of the combustion air may be controlled e.g. by controlling a combustion air preheater (not shown).

The temperature of the liquor may be controlled by a heat exchanger 146. Typically, by increasing the temperature (i.e. heating the liquor), the viscosity of the liquor is decreased, which results in smaller droplets 152. Correspondingly, by cooling the liquor, the viscosity is increased, and larger droplets 152 formed. The pressure of the liquor may be controlled by a pump 144.

Hereinabove, the angle or the first angle of the (first) injection gun 148 refers to the angle between the direction to which the injection gun 148 feeds the black/brown liquor and the downward vertical direction. This applies mutatis mutandis to the second angle. This affects, on one hand carryover, and on the other hand the location, to which the droplets 152 are fed. An electronic control unit or an operator may control the angle (or the first and/or the second angle).

The flow of black or brown through an injection gun 148 can be controlled e.g. by controlling a pump 144 (see FIGS. 1 to 3) configured to pump the black liquor and/or a valve 142 configured to limit the flow of black liquor. By using the valve 142 and/or the pump 144, a flow of black liquor through a certain injection gun 148 can be stopped, if needed. The pump 144 can be configured to control the pressure, by which the black liquor is fed through the injection gun 148. A set value for the pressure may be used to control the pump 144 and/or the valve 142 in such a way that a pressure of the black liquor in the injection gun 148 is controlled. In addition or alternatively, an orifice of the injection gun 148 can be controlled in a manner similar to the valve 142. By opening the orifice, more black liquor will be fed, and by closing, less. An orifice of an injection gun 148 can also be changed by an operator by applying a flow limiter to the injection gun 148. Such a limiter may be applied e.g. manually. If needed, at least one of a pump 144, a valve 142, and an orifice of an injection gun 148' may be controlled such that the flow through that injection gun 148' is stopped. Correspondingly, black liquor would flow through another injection gun 148. An electronic control unit or an operator may control least one of one of the pump 144, the valve 142, and the orifice of the injection gun 148.

Referring to FIG. 3, the flow of the combustion air through an air inlet $i_n^m$ (n=1, 2, 3; m=1, 2, 3) can be controlled e.g. by controlling a fan (114, 124, 134) configured to feed combustion air and/or by controlling a valve (112, 113, 122, 123, 132, 133) configured to control the flow of combustion air. If nozzles are used to feed combustion air, the orifices of the nozzles can be controlled, if needed. In FIG. 3, the fan 114 is for conveying air to the first level 110; the fan 124 is for conveying air to the second level 120; and the fan 134 is for conveying air to the third level 130. In FIG. 3, the valve 112 is for controlling the flow of air to the first level 110. Thus, the valve 112 may be used to control the total air flow through the air inlets $i_1^m$. In FIG. 3, the valve 122 is for controlling the flow of air to the second level 120. Thus, the valve 122 may be used to control the total air flow through the air inlets $i_2^m$. In FIG. 3, the valve 132 is for controlling the flow of air to the third level 130. Thus, the valve 132 may be used to control the total air flow through the air inlets $i_3^m$.

The effective cross sectional areas of the air inlets $i_n^m$ can be controlled by controlling the valves 113, 123, 133 (see FIG. 3). These valves may be implemented by using baffles. The effective areas, and correspondingly also the flows, can be controlled with the baffles. In the alternative, the effective cross sectional areas of the air inlets $i_n^m$ can be controlled by controlling orifices of the nozzles feeding the air.

In FIG. 3, the valves 113 are for controlling the air flow through the different air inlets $i_1^1$, $i_1^2$, $i_1^3$ of the first vertical level 110. In FIG. 3, the valves 123 are for controlling the air flow through the different air inlets $i_2^1$, $i_2^2$, $i_2^3$ of the second vertical level 120. In FIG. 3, the valves 133 are for controlling the air flow through the different air inlets $i_3^1$, $i_3^2$, $i_3^3$ of the third vertical level 130. In this way, each one of the valves 112, 122, 132 can be used to control the total amount of combustion air to one of the vertical levels, as indicated above. Moreover, the valves 113 can be used to control the air distribution within the first vertical level, the valves 123 can be used to control the air distribution within the second vertical level, and the valves 133 can be used to control the air distribution within the third vertical level. Typically, baffles may serve as the valves 113, 123, 133 responsible for air distribution within a certain vertical level. An electronic control unit or an operator may control least one of the pumps 114, 124, 134 and/or at least one of the valves 112, 113, 122, 123, 132, 133.

It is noted that all the parameters disclosed above relate to process control at the furnace area of the chemical recovery boiler. Therefore, it may be sufficient to apply such a computational model that takes into account only the furnace area of the chemical recovery boiler.

Figure 9:
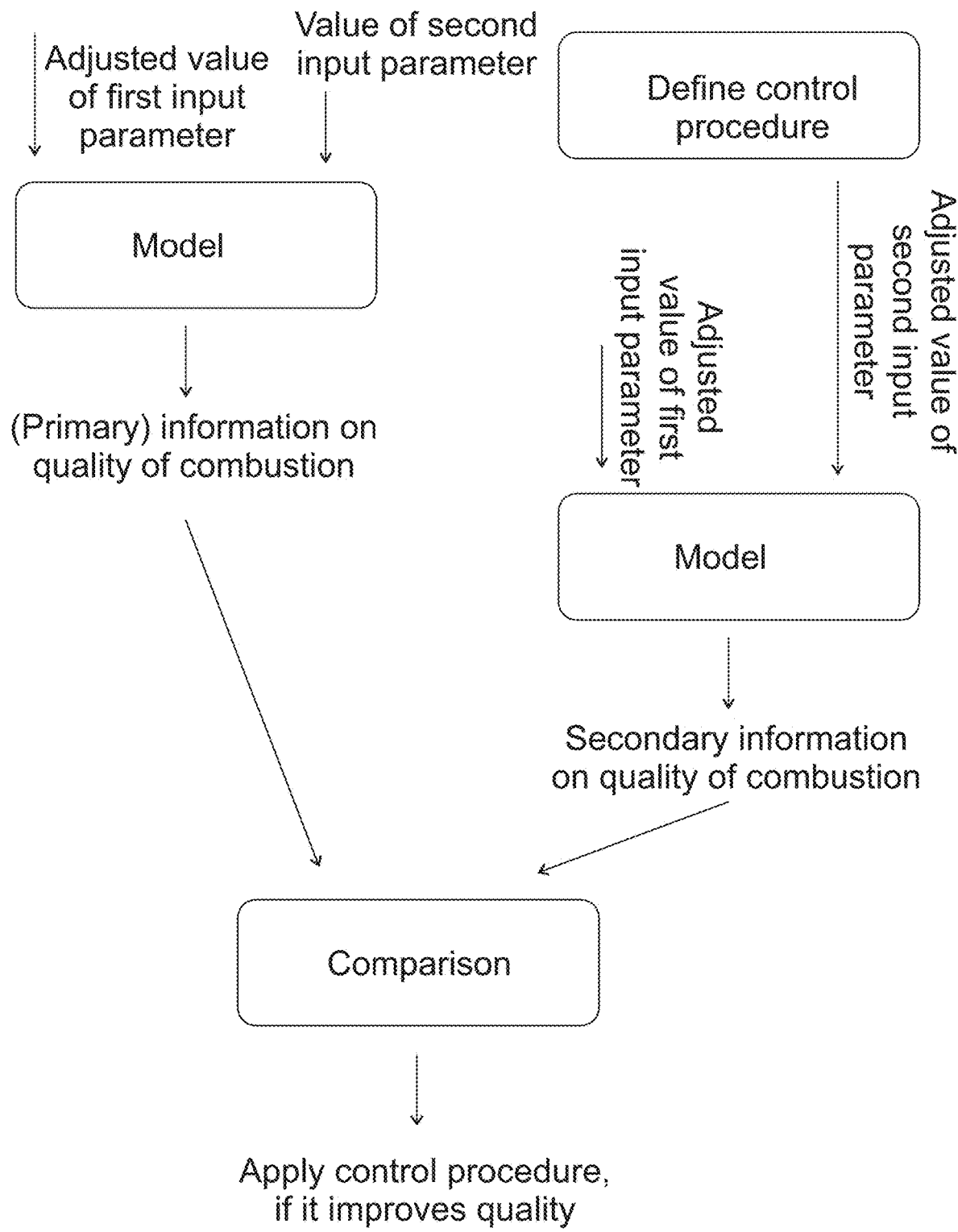
FIG. 9 shows a method for controlling a chemical recovery boiler, wherein a control procedure is applied if it—according to computational modelling—improves the quality of combustion of a liquor in a chemical recovery boiler.
Figure 10:
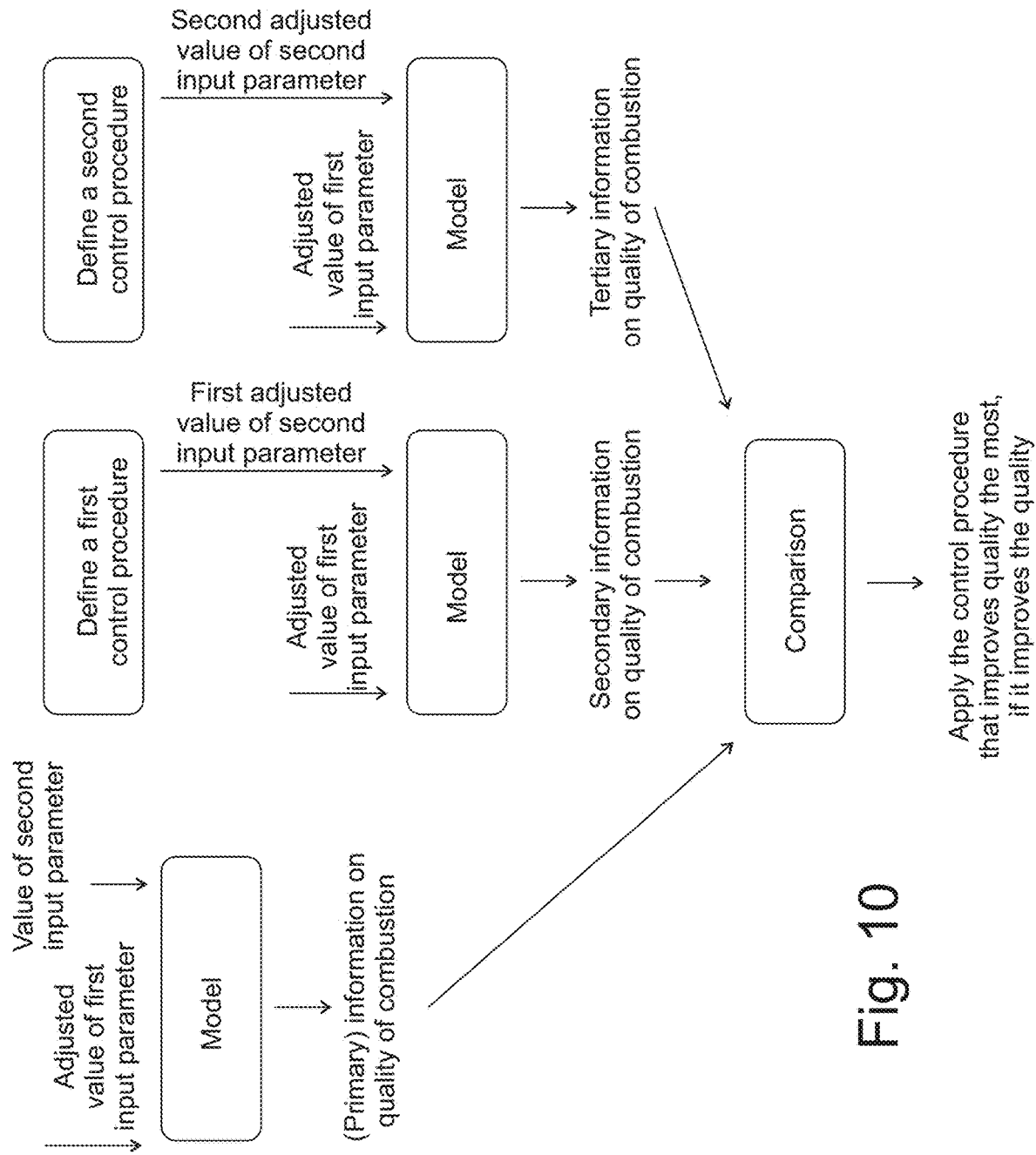
FIG. 10 shows a method for controlling a chemical recovery boiler, wherein of several control procedures, such a control procedure is applied that—according to computational modelling—improves the quality of combustion of a liquor in a chemical recovery boiler the most.

In order to improve the quality of process control, controlling the chemical recovery boiler may be done in a predictive manner. The predictive manner can be implemented in at least two ways. Referring to FIG. 9, it is possible to computationally check, before actually controlling the process, what would be the outcome of a control procedure. Then, if the outcome of the control procedure, as modelled, is good (i.e. according to the computations, the quality of combustion improves as a result of the control procedure), the control procedure may be implemented by controlling the process according to the control procedure. However if the outcome of the control procedure, as modelled, is not good, such control procedure needs not be implemented. Referring to FIG. 10, it is also possible to simulate an outcome of at least two different control procedures. Thereafter one may analyse, which one of the control procedures has the best effect on the quality of the combustion, and the process control according to that control procedure may be undertaken. If none of the control procedures seems to improve quality, none of those control procedures needs to be implemented.

In an embodiment corresponding to FIG. 9, the method for controlling a chemical recovery boiler comprises obtaining information on quality of combustion of a liquor in a chemical recovery boiler as detailed above. For clarity, such information may be called primary information on quality of combustion of a liquor in a chemical recovery boiler. The values of second input parameters are also used in the computational model. Moreover, a control procedure is defined. Furthermore, the method comprises adjusting the value of the second input parameter according to the control procedure to obtain an adjusted value of the second input parameter. For example, if the control procedure involves increasing air flow at an air inlet $i_n^m$, the value of the corresponding component of the second input parameter is increased accordingly to obtain the adjusted value of the second input parameter.

The embodiment comprises entering the adjusted value of the second input parameter to the computational model; and e.g. at a third time, running the computational model to obtain secondary information on quality of combustion of the liquor in the chemical recovery boiler. Finally the information (i.e. primary information) on the quality of combustion of the liquor in the chemical recovery boiler is compared with the secondary information on quality of combustion of the liquor in the chemical recovery boiler to obtain a secondary comparison result. When the secondary comparison result indicates that the quality of combustion, as indicated by the secondary information on quality of combustion of the liquor in the chemical recovery boiler is better than the quality of combustion, as indicated by the primary information on quality of combustion of the liquor in the chemical recovery boiler, the process can be controlled accordingly. Thus, the embodiment comprises controlling the chemical recovery boiler using the secondary comparison result. In other words, the method comprises determining that a quality of combustion, as indicated by the secondary information on quality of combustion of the liquor in the chemical recovery boiler is better than a quality of combustion, as indicated by the primary information on quality of combustion of the liquor in the chemical recovery boiler and controlling the chemical recovery boiler according to the control procedure.

In an embodiment corresponding to FIG. 10, the method for controlling a chemical recovery boiler comprises obtaining information on quality of combustion of a liquor in a chemical recovery boiler as detailed above. For clarity, such information may be called primary information on quality of combustion of a liquor in a chemical recovery boiler. The values of second input parameters are also used in the computational model.

Moreover, a first control procedure is defined. Furthermore, the method comprises adjusting the value of the second input parameter according to the first control procedure to obtain a first adjusted value of the second input parameter. For example, if the control procedure involves increasing air flow at an air inlet $i_n^m$, the value of the corresponding component of the second input parameter is increased accordingly to obtain the first adjusted value of the second input parameter. The embodiment comprises entering the first adjusted value of the second input parameter to the computational model; and at a third time, running the computational model to obtain secondary information on quality of combustion of the liquor in the chemical recovery boiler.

Furthermore, a second control procedure is defined, and the method comprises adjusting the value of the second input parameter according to the second control procedure to obtain a second adjusted value of the second input parameter. For example, if the control procedure involves increasing temperature of black liquor, the value of the corresponding component of the second input parameter is increased accordingly to obtain the second adjusted value of the second input parameter. The embodiment comprises entering the second adjusted value of the second input parameter to the computational model; and e.g. at a fourth time, running the computational model to obtain tertiary information on quality of combustion of the liquor in the chemical recovery boiler.

Finally one may compare, which one of the: the information (i.e. primary information) on quality of combustion of the liquor in the chemical recovery boiler, the secondary information on quality of combustion of the liquor in the chemical recovery boiler, and the tertiary information on quality of combustion of the liquor in the chemical recovery boiler results in the best quality of combustion of the liquor. The chemical recovery boiler may be controlled by applying the control procedure that give the highest quality of combustion; or omit the control, if each one of the control procedures seem to worsen the quality.

In other word, an embodiment comprises: determining that a quality of combustion, as indicated by the secondary information on quality of combustion of the liquor in the chemical recovery boiler is better than both of [i] a quality of combustion, as indicated by the primary information on quality of combustion of the liquor in the chemical recovery boiler [ii] a quality of combustion, as indicated by the tertiary information on quality of combustion of the liquor in the chemical recovery boiler; and controlling the chemical recovery boiler according to the first control procedure.

This applies in particular, when the first control procedure yields, according to simulations, the best results. Naturally, it may happen that second control procedure yields, according to simulations, the best results. What has been said above about determining and controlling applies mutatis mutandis. Thus, in such a case, the chemical recovery boiler is controlled according to the second control procedure. Even if FIG. 10 only discloses two control procedures, the results of a greater number of control procedures can be computed, and the best one of the control procedures selected, before actually controlling the recovery boiler in a similar manner.

Regarding in particular control of the chemical recovery boiler, it is noted that the control in a continuous process, which needs to be done all the time the chemical recovery boiler is in operation. Moreover, a chemical recovery boiler is in operation for a time of a maintenance interval, which may be e.g. a year or two years. However, as detailed above, within such a long period of time, the process conditions inside the chemical recovery boiler change, and in particular the values of the quantities corresponding to the first input parameters of the model change. This emphasizes why, in particular for purposes of controlling the chemical recovery boiler, the value of the first input parameter needs to be adjusted as detailed above.

Moreover, as indicated above, the process control is continuous, and different control procedures may be applied subsequently. Therefore, in an embodiment, during a first period of time, the chemical recovery boiler is controlled as detailed above. Moreover the embodiment comprises, during a second period of time, obtaining second information on quality of combustion of a liquor in a chemical recovery boiler as detailed above; and controlling, for example by an electronic control unit, the chemical recovery boiler using the second information on the quality of combustion of the liquor in the chemical recovery boiler. Herein the second period of time is later in time than the first period of time. As an example, in an embodiment, the second period of time starts at least 1 minute after the first period of time ends. The second period of time may start at least 15 minutes or at least 1 hour after the first period of time ends. In between these time periods, the combustion conditions inside the chemical recovery boiler change, and typically change so much that the quantities corresponding to the first parameters change. Thus, the adjusted value of the first parameter, as calculated during the first period of time, is no longer an accurate value for the value of the first parameter during the second period of time. This emphasizes the need of continuous adjustment of the value of the first parameter.

The invention claimed is:

1. A method for controlling a chemical recovery boiler, the method comprising:
- entering a value of a first input parameter to a computational model configured to determine, based on the value of the first input parameter, a value of the quality of combustion of liquor in the chemical recovery boiler,
- at a first time, running the computational model to obtain a first modelling result,
- measuring, from the chemical recovery boiler, a value indicative of carryover to obtain a measurement result,
- comparing the first modelling result with [a] the measurement result or [b] a result derived from the measurement result, to obtain a primary comparison result based on the value indicative of carryover,
- adjusting the value of the first input parameter based on the primary comparison result to obtain an adjusted value of the first input parameter,
- entering the adjusted value of the first input parameter to the computational model,
- at a second time, running the computational model with the adjusted value of the first input parameter to obtain information on quality of combustion of the liquor in the chemical recovery boiler, and
- controlling, in the chemical recovery boiler, at least one parameter selected from the group consisting of:
  - a temperature of black liquor or brown liquor that is fed into the furnace of the chemical recovery boiler, and
  - a pressure of the black or brown liquor that is fed into the furnace of the chemical recovery boiler,
- using the information on the quality of combustion of the liquor in the chemical recovery boiler.

2. The method of claim 1, wherein the value indicative of carryover is measured at least one of:
- directly with a carryover detector, or
- by measuring one or both of [i] a size of a char bed, and [ii] a temperature or a temperature profile at a location that is downstream from a liquor injection gun of the chemical recovery boiler, the liquor injection gun being configured to feed the liquor that is burnt into the chemical recovery boiler, and upstream from a superheater of the chemical recovery boiler, in the direction of flow of flue gases in the chemical recovery boiler.

3. The method of claim 1, wherein:
the computational model is based on fluid dynamics or the computational model is a reduced model.

4. The method of claim 1, wherein the value of the first input parameter comprises one or both of:
- a value of a model particle size of black or brown liquor within the chemical recovery boiler and/or
- a value of a model deposit thickness on a superheater of the chemical recovery boiler.

5. The method of claim 1, wherein:
the computational model comprises at least a first part describing a furnace area of the chemical recovery boiler.

6. The method of claim 1, wherein:

the computational model comprises a part describing a furnace area of the chemical recovery boiler; the method comprising:

entering also a value of a second input parameter to the computational model, wherein the value of the second input parameter comprises value(s) of one or more than one of:
- a first flow of combustion air through a first air inlet into the chemical recovery boiler and a second flow of combustion air through a second air inlet into the chemical recovery boiler,
- an effective cross sectional area of the first air inlet and an effective cross sectional area of the second air inlet,
- a temperature of combustion air at a first vertical level and a temperature of combustion air at a second vertical level,
- a first flow of black or brown liquor into the chemical recovery boiler through a first injection gun,
- a second flow of black or brown liquor into the chemical recovery boiler through a second injection gun,
- a pressure in a drum of the chemical recovery boiler,
- a dry matter content of the black or brown liquor that is fed into the chemical recovery boiler,
- a chemical content of dry matter of the black or brown liquor that is fed into the chemical recovery boiler,
- a heat value of the black or brown liquor that is fed into the chemical recovery boiler,
- a temperature of the black or brown liquor that is fed into the chemical recovery boiler,
- a pressure of the black or brown liquor that is fed into the chemical recovery boiler,
- a first angle of a first injection gun that feeds the black or brown liquor into the chemical recovery boiler,
- a second angle of a second injection gun that feeds the black or brown liquor into the chemical recovery boiler,
- a flow of concentrated non-condensable gases into the furnace of the chemical recovery boiler,
- a flow of another auxiliary fuel into the furnace of the chemical recovery boiler, or
- an oxygen content of flue gases.

7. The method of claim 6, comprising:

defining a first control procedure, adjusting the value of the second input parameter according to the first control procedure to obtain a first adjusted value of the second input parameter, entering the first adjusted value of the second input parameter to the computational model, thereafter, running the computational model to obtain secondary information on quality of combustion of the liquor in the chemical recovery boiler, and controlling the chemical recovery boiler using the secondary information on quality of combustion of the liquor in the chemical recovery boiler.

8. The method of claim 7, comprising:

defining a second control procedure, adjusting the value of the second input parameter according to the second control procedure to obtain a second adjusted value of the second input parameter, entering the second adjusted value of the second input parameter to the computational model, thereafter, running the computational model to obtain tertiary information on quality of combustion of the liquor in the chemical recovery boiler, and controlling the chemical recovery boiler using the secondary and tertiary information on quality of combustion of the liquor in the chemical recovery boiler.

9. The method of claim 1, wherein:

the computational model comprises a first part describing a furnace area of the chemical recovery boiler and second part describing a superheater area of the chemical recovery boiler; the method comprising:

entering also a value of a second input parameter to the computational model, wherein the value of the second input parameter comprises value(s) of one or more than one of:
- a first flow of combustion air through a first air inlet into the chemical recovery boiler and a second flow of combustion air through a second air inlet into the chemical recovery boiler,
- an effective cross sectional area of the first air inlet and an effective cross sectional area of the second air inlet,
- a temperature of combustion air at a first vertical level and a temperature of combustion air at a second vertical level,
- a first flow of black or brown liquor into the chemical recovery boiler through a first injection gun,
- a second flow of black or brown liquor into the chemical recovery boiler through a second injection gun,
- a pressure in a drum of the chemical recovery boiler,
- a dry matter content of the black or brown liquor that is fed into the chemical recovery boiler,
- a chemical content of dry matter of the black or brown liquor that is fed into the chemical recovery boiler,
- a heat value of the black or brown liquor that is fed into the chemical recovery boiler,
- a temperature of the black or brown liquor that is fed into the chemical recovery boiler,
- a pressure of the black or brown liquor that is fed into the chemical recovery boiler,
- a first angle of a first injection gun that feeds the black or brown liquor into the chemical recovery boiler,
- a second angle of a second injection gun that feeds the black or brown liquor into the chemical recovery boiler,
- a flow of concentrated non-condensable gases into the furnace of the chemical recovery boiler,
- a flow of another auxiliary fuel into the furnace of the chemical recovery boiler,
- an oxygen content of flue gases,
- a first temperature of the steam that is fed into a first superheater,
- a first pressure of the steam that is fed into a first superheater,
- a first mass flow of the steam that is fed into a first superheater,
- a second temperature of the steam that is fed into a second superheater,
- a second pressure of the steam that is fed into a second superheater,
- a second mass flow of the steam that is fed into a second superheater,
- a third temperature of the steam that is let out from the second superheater,
- a third pressure of the steam that is let out from the second superheater,
- a third mass flow of the steam that is let out from the second superheater,
- a fourth temperature of the steam that is let out from the first superheater, a fourth pressure of the steam that is let out from the first superheater, a fourth mass flow of the steam that is let out from the first superheater, an outlet temperature and an outlet pressure of the superheated steam that is let out from a last superheater, wherein the last superheater is the last in the direction of flow of steam, typically before a steam turbine utilizing the steam, for each superheater, temperatures, pressures, and flows of steam into the superheater and out of the superheater, a weight of the first superheater, a weight of the second superheater, or a velocity of a velocity distribution of the gases in the superheater area.

10. The method of claim 1, wherein the computational model comprises a first part describing a furnace area of the chemical recovery boiler, and the computational model is configured:

to model combustion conditions inside the chemical recovery boiler and to compute the value of the quality of combustion by using the thus modelled combustion conditions inside the chemical recovery boilers, wherein the combustion conditions inside the chemical recovery boiler comprise one or more than one of:

presence of carryover particles in the furnace area, amount of carryover particles in the furnace area, temperature in a vicinity of a char bed, content of oxygen ($O_2$) in a vicinity of the char bed, a size of the char bed, a temperature profile of gases in the furnace area, variance of a temperature profile of gases in the furnace area, symmetry of a temperature profile of gases in the furnace area, a flow velocity profile of gases in the furnace area, variance of a flow velocity profile of gases in the furnace area, heat flux through walls of the furnace of the chemical recovery boiler, black or brown liquor droplet accumulation on walls of the furnace of the chemical recovery boiler, content of carbon monoxide (CO) in the furnace area, content of oxygen ($O_2$) in the furnace area, or content of nitrogen oxide (NOx) in the furnace area.

11. The method of claim 1, wherein the computational model comprises a first part describing a furnace area of the chemical recovery boiler and a second part describing a superheater area of the chemical recovery boiler and the computational model is configured:

to model combustion conditions inside the chemical recovery boiler, and to compute the value of the quality of combustion by using the thus modelled combustion conditions inside the chemical recovery boiler, wherein the combustion conditions inside the chemical recovery boiler comprise one or more than one of:

presence of carryover particles in the furnace area and/or the superheater area, amount of carryover particles in the furnace area and/or the superheater area, temperature in a vicinity of a char bed, content of oxygen ($O_2$) in a vicinity of the char bed, a size of the char bed, a temperature profile of gases in the furnace area and/or the superheater area, variance of a temperature profile of gases in the furnace area and/or the superheater area, symmetry of a temperature profile of gases in the furnace area and/or the superheater area, a temperature profile of a surface of a superheater, a flow velocity profile of gases in the furnace area and/or the superheater area, variance of a flow velocity profile of gases in the furnace area and/or the superheater area, turbulence of flow velocity of gases in the superheater area, a location and size of ash sticky area in the superheater area, heat flux through walls of the furnace of the chemical recovery boiler, black or brown liquor droplet accumulation on walls of the furnace of the chemical recovery boiler, content of carbon monoxide (CO) in the furnace area and/or the superheater area, content of oxygen ($O_2$) in the furnace area and/or the superheater area, or content of nitrogen oxide (NOx) in the furnace area and/or the superheater area.

12. The method of claim 1, wherein the value of the first input parameter comprises a value of a model particle size of black or brown liquor within the chemical recovery boiler, the method comprising:

measuring a first value indicative of a first size of a char bed inside the chemical recovery boiler at a first instance of time, measuring a second value indicative of a second size of the char bed at a second instance of time, determining a true growth rate of the char bed using the first value and the second value, determining a model growth rate of the char bed using the first modelling result, comparing the true growth rate of the char bed with the model growth rate of the char bed to obtain the primary comparison result, and adjusting the model particle size based on the primary comparison result.

13. The method of claim 12, wherein:

the first value indicative of the first size of the char bed is measured using a camera configured to image the char bed.

14. The method of claim 1, wherein the value of the first input parameter comprises a value of a model deposit thickness on a superheater of the chemical recovery boiler, the method comprising:

measuring a first true temperature or temperature profile at a first location that is arranged, in the direction of flow of gases inside the chemical recovery boiler, downstream from an injection gun that is configured to feed black or brown liquor into the chemical recovery boiler and upstream from a superheater, measuring a second true temperature or temperature profile at a second location, wherein the second location is arranged such that at least a superheater is arranged in between the first location and the second location in the direction of flow of gases inside the chemical recovery boiler, determining a true temperature difference using the first true temperature or temperature profile and the second true temperature or temperature profile, determining a first model temperature or temperature profile at the first location using the first modelling result, determining a second model temperature or temperature profile at the second location using the first modelling result, determining a model temperature difference using the first model temperature or temperature profile and the second model temperature or temperature profile, comparing the true temperature difference with the model temperature difference to obtain the primary comparison result, and adjusting the value of the model deposit thickness on the superheater based on the primary comparison result.

15. The method of claim 14, wherein:
the value of the first input parameter comprises values of model deposit thicknesses on each superheater of the chemical recovery boiler, and
the method comprises adjusting at least one of the values of the model deposit thicknesses.

16. The method of claim 14, wherein the second true temperature or temperature profile is measured by one of: acoustic pyrometry, optical pyrometry, a suction pyrometer, laser spectroscopy, or a thermometer or thermometers.

17. The method of claim 14, wherein the first true temperature or temperature profile and/or the third true temperature profile is measured by one or more of acoustic pyrometry, optical pyrometry, a suction pyrometer, laser spectroscopy, and/or a thermometer or thermometers.

18. The method of claim 1, wherein:
the value of the first input parameter comprises a value of a model particle size of black or brown liquor within the chemical recovery boiler, and the method comprises:
measuring a third true temperature profile at third location that is arranged, in the direction of flow of gases inside the chemical recovery boiler, downstream from an injection gun that is configured to feed black or brown liquor into the chemical recovery boiler and upstream from a superheater, determining a third model temperature profile at the third location using the first modelling result, comparing the third true temperature profile with the third model temperature profile to obtain the primary comparison result, and adjusting the value of the model particle size based on the primary comparison result.

19. The method of claim 1, comprising, before entering the value of the first input parameter to the computational model, the steps of entering an initial value of the first input parameter to the computational model, running the computational model to obtain an initial modelling result describing the quality of combustion of the liquor in the chemical recovery boiler, comparing the initial modelling result with [a] the measurement result or [b] a result derived from the measurement result, to obtain an initial comparison result, and adjusting the initial value of the first input parameter based on the initial comparison result to obtain the value of the first input parameter.

* * * * *